(12) United States Patent
Kim et al.

(10) Patent No.: US 12,167,437 B2
(45) Date of Patent: Dec. 10, 2024

(54) METHOD AND APPARATUS FOR UPLINK TRANSMISSIONS WITH DIFFERENT RELIABILITY CONDITIONS

(71) Applicant: ELECTRONICS AND TELECOMMUNICATIONS RESEARCH INSTITUTE, Daejeon (KR)

(72) Inventors: Cheul Soon Kim, Daejeon (KR); Sung Hyun Moon, Daejeon (KR); Jung Hoon Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 475 days.

(21) Appl. No.: 17/496,696

(22) Filed: Oct. 7, 2021

(65) Prior Publication Data

US 2022/0116953 A1    Apr. 14, 2022

(30) Foreign Application Priority Data

| Oct. 8, 2020 | (KR) | 10-2020-0130504 |
| Feb. 4, 2021 | (KR) | 10-2021-0016104 |
| Feb. 19, 2021 | (KR) | 10-2021-0022713 |
| May 7, 2021 | (KR) | 10-2021-0059356 |
| Aug. 13, 2021 | (KR) | 10-2021-0107578 |
| Sep. 14, 2021 | (KR) | 10-2021-0122472 |

(51) Int. Cl.
| *H04B 7/06* | (2006.01) |
| *H04L 1/00* | (2006.01) |
| *H04L 1/1812* | (2023.01) |
| *H04L 5/00* | (2006.01) |
| *H04W 72/0446* | (2023.01) |
| *H04W 72/21* | (2023.01) |
| *H04W 72/23* | (2023.01) |

(Continued)

(52) U.S. Cl.
CPC ........... *H04W 72/56* (2023.01); *H04L 1/0003* (2013.01); *H04L 1/1819* (2013.01); *H04L 5/0053* (2013.01); *H04W 72/0446* (2013.01); *H04W 72/21* (2023.01); *H04W 72/23* (2023.01); *H04W 72/54* (2023.01)

(58) Field of Classification Search
None
See application file for complete search history.

(56) References Cited

U.S. PATENT DOCUMENTS

| 11,140,575 B2* | 10/2021 | Rico Alvarino | ...... H04L 1/0004 |
| 11,558,768 B2* | 1/2023 | Rahman | ................ H04W 72/21 |

(Continued)

FOREIGN PATENT DOCUMENTS

| WO | 2020096330 A1 | 5/2020 |
| WO | 2020145610 A1 | 7/2020 |
| WO | 2020231182 A1 | 11/2020 |

*Primary Examiner* — Sithu Ko
(74) *Attorney, Agent, or Firm* — LRK PATENT LAW FIRM

(57) ABSTRACT

An operation method of a terminal in a communication system may include: selecting one or more control elements among a plurality of control elements included first UCI in consideration of a size of an uplink resource; generating multiplexed UCIs by multiplexing second UCI with the one or more control elements; and transmitting the multiplexed UCIs to a base station by using the uplink resource.

15 Claims, 14 Drawing Sheets

(51) Int. Cl.
 *H04W 72/54* (2023.01)
 *H04W 72/56* (2023.01)

(56) References Cited

U.S. PATENT DOCUMENTS

| | | | | |
|---|---|---|---|---|
| 11,632,218 | B2* | 4/2023 | Shin | H04W 72/12 |
| | | | | 370/329 |
| 11,646,819 | B2* | 5/2023 | Gao | H04W 72/1263 |
| | | | | 370/329 |
| 11,690,065 | B2* | 6/2023 | Shin | H04W 76/28 |
| | | | | 370/329 |
| 11,723,018 | B2* | 8/2023 | Wang | H04L 5/0094 |
| | | | | 370/329 |
| 11,844,103 | B2* | 12/2023 | Khoshnevisan | H04L 1/1854 |
| 2019/0342878 | A1 | 11/2019 | Kim et al. | |
| 2020/0252168 | A1 | 8/2020 | Kim et al. | |
| 2020/0305147 | A1 | 9/2020 | Lee et al. | |
| 2020/0344788 | A1 | 10/2020 | Li et al. | |
| 2020/0413425 | A1 | 12/2020 | Lin et al. | |
| 2021/0250134 | A1* | 8/2021 | Islam | H04B 7/0626 |
| 2022/0279559 | A1* | 9/2022 | Wong | H04L 5/0053 |
| 2023/0042299 | A1* | 2/2023 | Zhou | H04W 72/0446 |

* cited by examiner

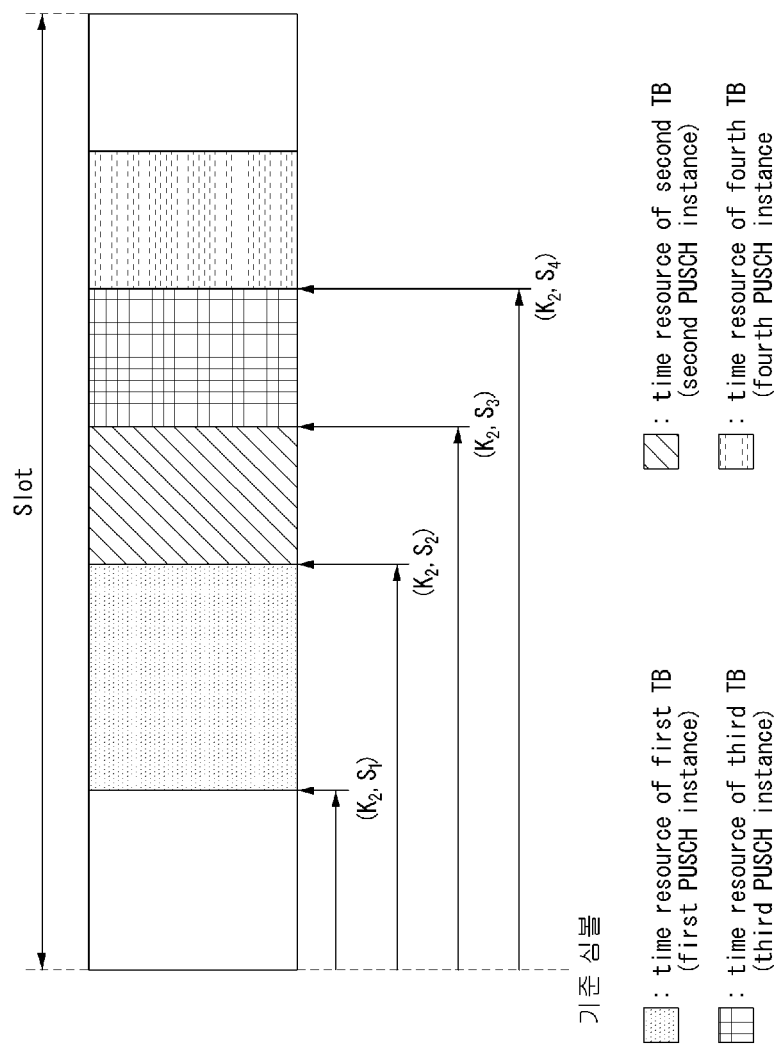

METHOD AND APPARATUS FOR UPLINK TRANSMISSIONS WITH DIFFERENT RELIABILITY CONDITIONS

CROSS-REFERENCE TO RELATED APPLICATIONS

This application claims priority to Korean Patent Applications No. 10-2020-0130504 filed on Oct. 8, 2020, No. 10-2021-0016104 filed on Feb. 4, 2021, No. 10-2021-0022713 filed on Feb. 19, 2021, No. 10-2021-0059356 filed on May 7, 2021, No. 10-2021-0107578 filed on Aug. 13, 2021, and No. 10-2021-0122472 filed on Sep. 14, 2021 with the Korean Intellectual Property Office (KIPO), the entire contents of which are hereby incorporated by reference.

BACKGROUND

1. Technical Field

The present disclosure relates to a technique for uplink transmission in a communication system, and more particularly, to a technique for transmitting traffic having different reliability conditions.

2. Description of Related Art

With the development of information and communication technologies, various wireless communication technologies are being developed. Representative wireless communication technologies include long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The 5G communication system may support enhanced Mobile BroadBand (eMBB), Ultra Reliable Low Latency Communication (URLLC), and Massive Machine Type Communication (mMTC).

On the other hand, in order to provide a communication service in an unlicensed band, a communication node (e.g., base station or terminal) should use radio resources with fairness by using a sensing procedure (e.g., listen before talk (LBT) procedure or clear channel assessment (CCA) procedure). In this case, the sensing procedure may have different configuration parameters according to importance of data. The communication node (e.g., base station or terminal) may transmit a signal and/or channel through the sensing procedure. In a special case (e.g., when a transmission operation is performed within a channel occupancy time (COT) secured by a base station and/or terminal), a signal and/or channel may be transmitted without the sensing procedure.

A beam-based sensing procedure in an unlicensed band may be classified into two types. For example, the sensing procedure may be classified into an omni-directional sensing procedure and a directional sensing procedure. When the omni-directional sensing procedure is applied, a base station may not perform a transmission operation even when an energy is detected in a direction that does not interfere with a terminal. This problem may be referred to as 'exposed node problem'. When the directional sensing procedure is applied, a hidden node problem may occur. In this case, even when an energy is not detected in the sensing procedure of the base station, transmission of the base station may interfere with another terminal (e.g., hidden node).

Meanwhile, a terminal may transmit uplink control information (UCI) to a base station. UCIs may have different priorities. For example, UCIs may be classified into high priority (HP) UCI having a high priority and low priority (LP) UCI having a low priority. For transmission of HP UCI and LP UCI, a method for multiplexing UCIs may be required. In addition, a method of transmitting the multiplexed UCIs may be required.

SUMMARY

Accordingly, exemplary embodiments of the present disclosure provide methods and apparatuses for transmitting data having different reliability conditions.

According to a first exemplary embodiment of the present disclosure, an operation method of a terminal in a communication system may comprise: selecting one or more control elements among a plurality of control elements included first uplink control information (UCI) in consideration of a size of an uplink resource; generating multiplexed UCIs by multiplexing second UCI with the one or more control elements; and transmitting the multiplexed UCIs to a base station by using the uplink resource.

When a total size of the first UCI is a first size, and the first UCI having a second size smaller than the first size is multiplexable with the second UCI, the one or more control elements may be selected among the plurality of control elements and transmission of remaining control elements may be dropped.

When the plurality of control elements include channel state information (CSI) and hybrid automatic repeat request-acknowledgement (HARQ-ACK), the one or more control elements may be the HARQ-ACK, a part of the CSI and the HARQ-ACK, a CSI part 1 of the CSI and the HARQ-ACK, or a CSI part 2 of the CSI and the HARQ-ACK.

The operation method may further comprise receiving, from the base station, information indicating multiplexing of the first UCI and the second UCI, wherein the multiplexed UCIs are generated in response to receiving the information.

The first UCI may be low priority (LP) UCI having a low priority, and the second UCI may be high priority (HP) UCI having a high priority.

The uplink resource may be a physical uplink control channel (PUCCH) resource or a physical uplink shared channel (PUSCH) resource.

The uplink resource may be a PUCCH resource, and a PUCCH resource set to which the PUCCH resource belongs may be determined in consideration of a size of the one or more control elements and a size of the second UCI.

The operation method may further comprise: receiving first downlink control information (DCI) from the base station; and receiving second DCI from the base station, wherein transmission of the first UCI is indicated by the first DCI, and transmission of the second UCI is indicated by the second DCI.

According to a second exemplary embodiment of the present disclosure, an operation method of a terminal in a communication system may comprise: generating a first codeword for first UCI based on a first code rate; generating a second codeword for second UCI based on a second code rate; generating multiplexed UCIs by multiplexing the first codeword and the second codeword; and transmitting the multiplexed UCIs to a base station by using a PUCCH resource.

The first code rate and the second code rate may be associated with the PUCCH resource.

The first code rate may be associated with a first PUCCH format for the first UCI, and the second code rate may be associated with a PUCCH resource for the second UCI.

The first code rate may be associated with a first PUCCH format for the first UCI, and the second code rate may be associated with a second PUCCH format for the second UCI.

A first PUCCH format for the first UCI may be derived from first downlink control information (DCI) received from the base station, and a second PUCCH format for the second UCI may be derived from second DCI received from the base station.

When the second code rate for a PUCCH resource for the second UCI is not indicated, the second code rate may be associated with a format of the PUCCH resource for the second UCI, and when the second code rate for the PUCCH resource for the second UCI is indicated, the second code rate may be associated with the PUCCH resource for the second UCI.

The PUCCH resource may be configured for transmission of the second UCI, the first UCI may be low priority (LP) UCI having a low priority, and the second UCI may be high priority (HP) UCI having a high priority.

According to a third exemplary embodiment of the present disclosure, a terminal may comprise: a processor; a memory electronically communicating with the processor; and instructions stored in the memory, wherein when executed by the processor, the instructions cause the terminal to: select one or more control elements among a plurality of control elements included first UCI in consideration of a size of an uplink resource; generate multiplexed UCIs by multiplexing second UCI with the one or more control elements; and transmit the multiplexed UCIs to a base station by using the uplink resource.

When a total size of the first UCI is a first size, and the first UCI having a second size smaller than the first size is multiplexable with the second UCI, the one or more control elements may be selected among the plurality of control elements and transmission of remaining control elements may be dropped.

When the plurality of control elements include channel state information (CSI) and hybrid automatic repeat request-acknowledgement (HARQ-ACK), the one or more control elements may be the HARQ-ACK, a part of the CSI and the HARQ-ACK, a CSI part 1 of the CSI and the HARQ-ACK, or a CSI part 2 of the CSI and the HARQ-ACK.

A first codeword for the one or more control elements may be generated based on a first code rate, a second codeword for the second UCI may be generated based on a second code rate, and the first code rate or the second code rate may be associated with the PUCCH resource.

A first codeword for the one or more control elements may be generated based on a first code rate, a second codeword for the second UCI may be generated based on a second code rate, the first code rate may be associated with a first PUCCH format for the first UCI, the second code rate may be associated with a second PUCCH format for the second UCI, and the first PUCCH format may be configured identically to or differently from the second PUCCH format.

According to the exemplary embodiments of the present disclosure, the terminal may multiplex LP UCI and HP UCI, and transmit the multiplexed UCIs (e.g., LP UCI+HP UCI) by using an uplink resource. In this case, the terminal may transmit a part of control elements included in the LP UCI in consideration of the size of the uplink resource, and may drop transmission of the remaining control elements. A procedure for encoding each of the LP UCI and the HP UCI may be independently performed.

For example, a different code rate may be applied to each of the LP UCI and HP UCI. According to the above-described operations, the procedure for multiplexing the UCIs and the procedure for transmitting the multiplexed UCIs can be efficiently performed, and the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which:

FIG. 9 is a conceptual diagram illustrating a first exemplary embodiment of a method for configuring PUSCHs according to SLIVs indicated by a TDRA index.

Figure 1:
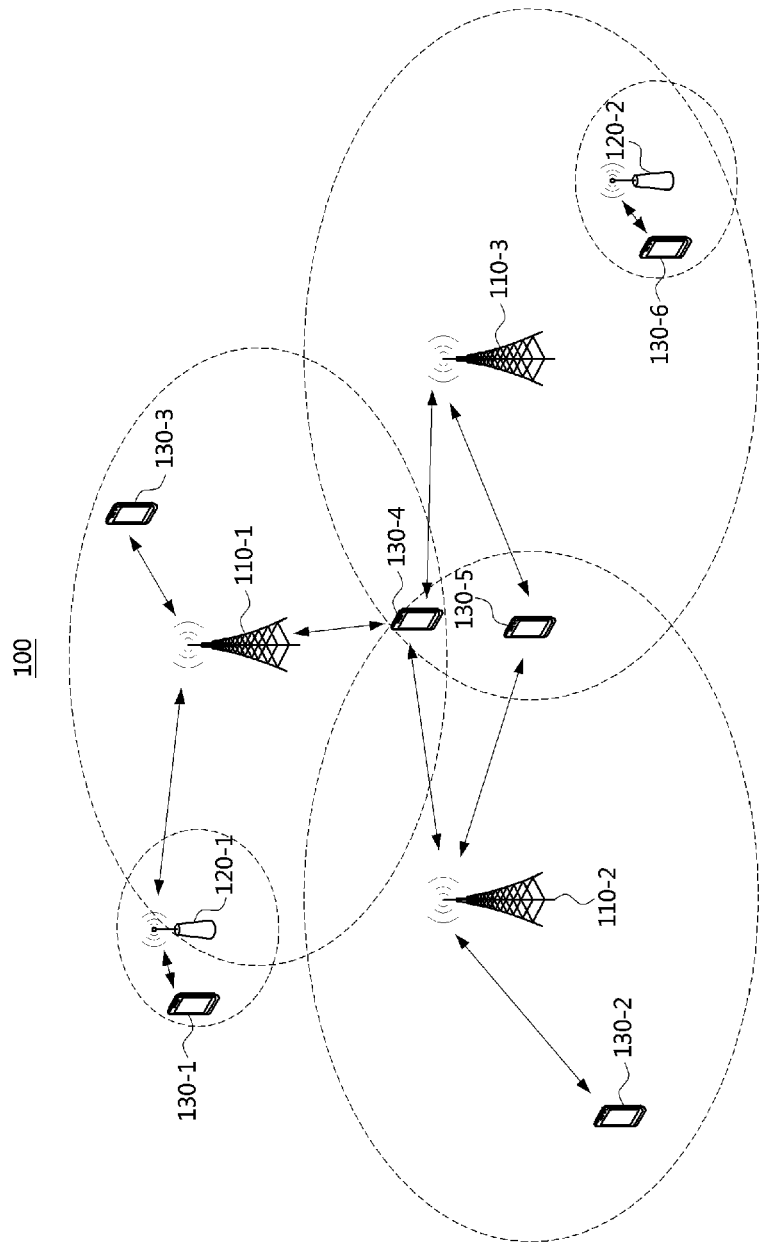
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In the embodiments of the present disclosure, "at least one of A and B" may mean "at least one of A or B" or "at least one of combinations of one or more of A and B". Also, in the embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.). The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication networks. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
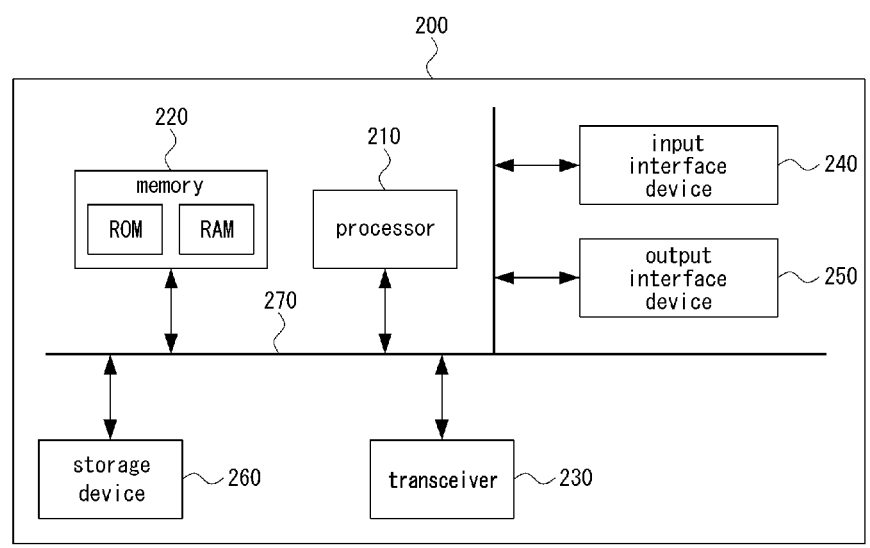
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each of the components included in the communication node 200 may not be connected to the processor 210 not through the common bus 270 but through an individual interface or an individual bus. For example, the processor 210 may be connected to at least one of the memory 220, the transceiver 230, the input interface device 240, the output interface device 250, and the storage device 260 through a dedicated interface(s).

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner.

Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in the communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Chapter 1: Introduction

In order to support service scenarios of enhanced Mobile BroadBand (eMBB), Ultra-Reliable and Low-Latency Communication (URLLC), and massive Machine Type Communication (mMTC), technical requirements are being studied in the 3GPP. The purpose of the eMBB service may be processing of large-capacity traffic, the purpose of the URLLC service may be reduction of end-to-end latency and error rate, and the purpose of the mMTC service may be processing of intermittent traffic or periodic traffic in a geographic area with high UE density. One communication system may support one or more service scenarios simultaneously. For the service scenario(s), one communication system may be operated by variously adjusting configuration parameters (e.g., numerology) of OFDM waveforms. One numerology may be used in the LTE communication system, and one or more numerologies may be applied according to situations in the NR communication system.

A time division duplex (TDD)-based communication system (hereinafter, referred to as 'TDD system') may support both the eMBB service and the URLLC service. In this case, the low-latency performance of the URLLC service may be improved. Since uplink hybrid automatic repeat request-acknowledgement (UL HARQ-ACK) is required to support downlink (DL) traffic, a delay time experienced by the DL traffic may be determined by a period in which DL slots and UL slots repeatedly appear. Even in case of UL traffic, since a base station indicates a UL grant to a terminal in a DL slot, a delay time experienced by the UL traffic may be determined by a period in which DL slots and UL slots repeatedly appear. In the NR communication system, the type of slot may be dynamically converted to be suitable for a situation. The terminal may identify DL symbols, UL symbols, or flexible (FL) symbol on a slot basis. The FL symbol may be re-indicated to a DL symbol or a UL symbol. In the LTE communication system, the type of subframe may be converted to be suitable for a situation. The type of subframe may be a DL subframe, a UL subframe, and a special subframe. There is no concept of a FL subframe (or FL symbol) in the LTE communication system.

Among UL channels transmitted by the terminal, a physical uplink shared channel (PUSCH) and a physical uplink control channel (PUCCH) may be considered. A PUSCH may be dynamically scheduled. Alternatively, it may be indicated that a PUSCH is periodically transmitted. The periodic PUSCH transmission method may be classified into two schemes according to a periodic PUSCH transmission indication scheme. Uplink-related downlink control information (UL-DCI) may be utilized to activate a semi-static PUSCH in the LTE communication system. Considering URLLC traffic in the NR communication system, in order to reduce dependence on an error rate of UL-DCI, periodic PUSCH transmission may be indicated only by higher layer signaling instead of UL-DCI.

On the other hand, in order to provide a communication service in an unlicensed band, a communication node (e.g., base station or terminal) may use radio resource with fairness by using a sensing procedure (e.g., listen before talk (LBT) procedure or clear channel assessment (CCA) procedure. In this case, the sensing procedure may have different configuration parameters according to importance of data. The communication node (e.g., base station or terminal) may transmit a signal and/or channel through the sensing procedure. In a special case (e.g., when a transmission operation is performed within a channel occupancy time (COT) secured by a base station and/or terminal), a signal and/or channel may be transmitted without the sensing procedure.

A beam-based sensing procedure in an unlicensed band may be classified into two types. For example, the sensing procedure may be classified into an omni-directional sensing procedure and a directional sensing procedure. When the omni-directional sensing procedure is applied, a base station may not perform a transmission operation even when an energy is detected in a direction that does not interfere with a terminal. This problem may be referred to as 'exposed node problem'. When the directional sensing procedure is applied, a hidden node problem may occur. In this case, even when an energy is not detected in the sensing procedure of the base station, transmission of the base station may interfere with another terminal (e.g., hidden node). Uplink control information (UCI) may include scheduling request (SR), channel state information (CSI), hybrid automatic repeat request-acknowledgement (HARQ-ACK), and/or link recovery request (LRR). Each of the SR, CSI, HARQ-ACK, and LRR included in UCI may be referred to as a control element. That is, UCI may include one or more control elements (e.g., SR, CSI, HARQ-ACK, and/or LRR). UCI may be used to manage downlink. The information (e.g., SR, CSI, HARQ-ACK, and/or LRR) included in UCI may vary according to a UCI type. UCI may be transmitted on a physical uplink control channel (PUCCH) and/or a physical uplink shared channel (PUSCH). When a PUCCH and a PUSCH overlap in one or more symbols, UCI may be transmitted on the PUSCH instead of the PUCCH. In this case, the PUCCH may not be transmitted. When a frequency band (e.g., FR1) in which the PUCCH is transmitted is different from a frequency band (e.g., FR2) in which the PUSCH is transmitted, the PUSCH and the PUCCH may be transmitted simultaneously. When the PUCCH and the PUSCH overlap in one or more symbols, the terminal may compare a priority of the PUCCH with a priority of the PUSCH. Transmission having a lower priority among PUCCH transmission and PUSCH transmission may be dropped. The size of UCI may be expressed as a sum of the number of bits representing the UCI types. The size of UCI may be used to determine a PUCCH resource.

One UCI type may correspond to one PUCCH resource on a one-to-one basis. When PUCCH resources corresponding to different UCI types overlap in the time domain, the terminal may select an appropriate PUCCH resource set again based on the sum of sizes of the corresponding UCI types. Also, the terminal may apply a PUCCH resource index indicated by downlink control information (DCI). When UCI types not scheduled by DCI are multiplexed, a transmission resource of the multiplexed UCI types may be indicated by a PUCCH resource index configured by RRC signaling. This operation may mean that the multiplexed UCI types are periodically transmitted. The base station may indicate (e.g., configure) to the terminal 'multiplexing of UCI types' and/or PUCCH resource for transmission of UCI type(s)' through RRC signaling.

The PUCCH resource may be determined as follows. The base station may transmit PUCCH-configCommon and/or PUCCH-config to the terminal through RRC signaling (e.g., system information block1 (SIB1) or dedicated signaling). A PUCCH resource set(s) for the terminal may be indicated by PUCCH-configCommon and/or PUCCH-config. The terminal may select one PUCCH resource set from among PUCCH resource sets indicated by the base station according to the size of UCI. The PUCCH resource set may include a plurality of PUCCH resources. Each of the plurality of PUCCH resources may be indicated by a PUCCH resource index. The base station may inform the terminal of the PUCCH resource index through DCI or RRC signaling. The terminal may identify the PUCCH resource indicated by the PUCCH resource index received from the base station among the plurality of PUCCH resources.

A configured grant (CG)-UCI may be used for transmission of CG PUSCH(s) in an unlicensed band. The CG-UCI may include transport block (TB) information and/or channel occupancy time (COT) information. The TB information may include HARQ process number, redundancy version (RV), and/or new data indicator (NDI). The COT information may include COT sharing information. The CG-UCI may be transmitted on a PUSCH.

The terminal may transmit UCI and/or CG-UCI. The priority of the UCI may be different from that of the CG-UCI. The UCI and/or CG-UCI may be used for transmission of a TB. Therefore, a priority of the TB may be considered as 'UCI priority' or 'CG-UCI priority'. In a procedure of allocating a PUSCH resource, physical downlink shared channel (PDSCH) resource, or physical sidelink shared channel (PSSCH) resource by DCI and/or RRC signaling, the priority of the TB may be set, and the priority of the TB may be used as UCI priority or CG-UCI priority. Periodic CSI and/or semi-persistent CSI may have a low priority. A priority of an SR and a priority of an LRR may be set by RRC signaling. A priority of HARQ-ACK for a PSSCH may be set to be the same as the priority of the TB. A case where the priority of the HARQ-ACK exceeds a priority threshold indicated by RRC signaling may be distinguished from a case where the priority of the HARQ-ACK does not exceed the priority threshold indicated by RRC signaling. The priority of the HARQ-ACK for the PSSCH may not correspond to the priority of the TB on a one-to-one basis as an exception. In this case, the priority of the TB may be derived from the priority of the HARQ-ACK for the PSSCH.

UCI and CG-UCI having different priorities may not be multiplexed. In this case, the terminal may transmit one control information (e.g., high priority (HP) UCI or HP CG-UCI) having a higher priority among the UCI and CG-UCI. Alternatively, the terminal may transmit one control information (e.g., low priority (LP) UCI or LP CG-UCI) having a lower priority among the UCI and CG-UCI. The terminal may assume that HP UCI types are multiplexed, and may generate a HP PUCCH (e.g., virtual HP PUCCH) based on the assumption. The terminal may assume that LP UCI types are multiplexed, and may generate a LP PUCCH (e.g., virtual LP PUCCH) based on the assumption. When a HP PUCCH overlaps a LP PUCCH in the time domain, the terminal may transmit the HP PUCCH including HP UCI type(s). Therefore, only UCI types having the same priority may be multiplexed. Alternatively, one UCI type among the UCI types may be dropped as needed. The base station may predict the UCI type dropped in the terminal. Accordingly, the base station may instruct the terminal to transmit the dropped UCI type (e.g., UCI or CG-UCI) by performing a scheduling operation for the dropped UCI type.

In the present disclosure, methods of multiplexing LP UCI and HP UCI, methods of transmitting multiplexed UCIs (e.g., LP UCI+HP UCI) on a PUCCH, and methods of transmitting multiplexed UCIs on a PUSCH will be proposed. In the present disclosure, UCI and UCI type may have the same meaning, UCI may refer to 'UCI' or 'CG-UCI', and a UCI-related operation may be interpreted as a CG-UCI-related operation. That is, the UCI-related operation may be applied for CG-UCI transmission, and the CG-UCI-related operation may be applied for UCI transmission.

Chapter 2: PUCCH Resource Determination Method

For multiplexing of HP UCI and LP UCI, the terminal may consider a case where one UCI type is indicated by DCI and/or a case where a PUCCH resource or PUSCH resource for all UCI types is indicated by RRC signaling. Methods for determining a PUCCH resource in which both LP UCI and HP UCI are multiplexed will be proposed.

In exemplary embodiments, a PUCCH transmitted by the terminal may be distinguished from a PUCCH resource, DCI indicating transmission of LP UCI may be referred to as LP DCI, and DCI indicating transmission of HP UCI may be referred to as HP DCI. In addition, an SR may mean 'scheduling request', 'link recovery request', or 'scheduling request and link recovery request'.

2.1: Methods for Determining a PUCCH Resource Set Considering Both a LP UCI Size and a HP UCI Size A UCI type may correspond to a PUCCH resource on a one-to-one basis. Methods for determining PUCCH resources of UCI types having different priorities will be described. Here, a LP UCI size may be expressed by x bits, and a HP UCI size may be expressed by y bits. Each of x and y may be a natural number. Alternatively, the LP UCI size may be a value of a function based on x considering a code rate applied to the LP UCI, and the HP UCI size may be a value of a function based on y considering a code rate applied to the HP UCI. (x+y) may refer to an arithmetic sum of x and y. Alternatively, (x+y) may refer to a value derived based on a value of the function based on x and a value of the function based on y.

Method 2.1-1: The terminal may multiplex UCI types having the same priority. The terminal may derive one PUCCH resource for each priority, and may derive a PUCCH resource capable of multiplexing all UCIs.

Method 2.1-2: The terminal may determine a PUCCH resource set by utilizing both the LP UCI size (e.g., a value derived from x) and the HP UCI size (e.g., a value derived from y) identified in Method 2.1-1. The terminal may multiplex all or part of the LP UCI with all of the HP UCI, and may transmit the multiplexed UCIs in a PUCCH resource.

The base station may instruct the terminal to multiplex the HP UCI and the LP UCI. In this case, the terminal may determine a PUCCH resource set in consideration of both the HP UCI size and the LP UCI size. The terminal may select a PUCCH resource within the PUCCH resource set based on a PUCCH resource indicator (PRI) or a PUCCH resource index indicated by DCI and/or RRC signaling. For example, (x+y) bits may be a reference for determining the PUCCH resource set. A PUCCH resource set when (x+y) is 1 bit or 2 bits may be distinguished from a PUCCH resource set when (x+y) is 3 bits.

Some UCI types of the LP UCI or a part of UCI types of the LP UCI may be dropped. For example, when the terminal intends to transmit LP UCI including CSI (or LP UCI including CSI and HARQ-ACK), all or part of the CSI may be dropped. In this case, when the CSI is divided into a CSI part 1 and a CSI part 2, the CSI part 1 and/or the CSI part 2 may be dropped. The terminal may transmit the LP UCI including the non-dropped CSI part(s). Here, the LP UCI may be multiplexed with the HP UCI. For another example, when the terminal intends to transmit LP UCI including an SR and HP UCI including an SR, the SR of the LP UCI may be dropped. Accordingly, the terminal may transmit some bits among x bits in the PUCCH resource. However, if Method 2.1-2 is used, the terminal may determine the PUCCH resource set by using (x+y).

Method 2.1-3: In Method 2.1-1, the terminal may select control elements (e.g., some control elements) that can be transmitted in a PUCCH resource among all control elements (e.g., CSI and HARQ-ACK) included in the LP UCI. That is, when the LP UCI and the HP UCI are multiplexed in the PUCCH resource, the terminal may select transmittable control elements in consideration of the size of the PUCCH resource. The some control elements may include the HARQ-ACK, 'part of the CSI+HARQ-ACK', 'CSI part 1+HACK-ACK', or 'CSI part 2+HARQ-ACK'. The some control elements may be selected by considering x'. The terminal may determine a PUCCH resource set by utilizing both the LP UCI size including the selected control elements and the HP UCI size (e.g., value derived from y). In addition, the terminal may select a PUCCH resource within the PUCCH resource set. The terminal may generate multiplexed UCIs (e.g., LP UCI+HP UCI) by multiplexing the LP UCI (e.g., LP UCI including the selected control elements) and the HP UCI, and may transmit the multiplexed UCIs to the base station in the PUCCH resource. In the above operations, the PUCCH resource set may be interpreted also as a PUSCH resource set, and the PUCCH resource may be interpreted also as a PUSCH resource.

The base station may instruct the terminal to multiplex HP UCI and LP UCI. The terminal may consider both the HP UCI size and the LP UCI size. In particular, the terminal may first calculate a transmission size of the LP UCI. When the LP UCI size is x bits, but the LP UCI and the HP UCI are multiplexed, the transmittable LP UCI size may be x' bits. x' may be less than x. For example, in transmission of the LP UCI including CSI, (part of) CSI, (part of) CSI part 1, or (part of) CSI part 2 may be dropped. Alternatively, all of the CSI may be dropped. For another example, in the transmission of the LP UCI including CSI and HARQ-ACK, all CSI or part of (e.g., CSI part 1 or CSI part 2) CSI of the LP UCI may be dropped, and only the HARQ of the LP UCI may be multiplexed with the HP UCI. The terminal may calculate the size of the LP UCI (e.g., LP UCI from which some control elements are dropped), and (x'+y) bits may be used as a reference for determining the PUCCH resource set. The terminal may select a PUCCH resource from the PUCCH resource set based on a PRI or PUCCH resource index indicated by DCI and/or RRC signaling.

Figure 3:
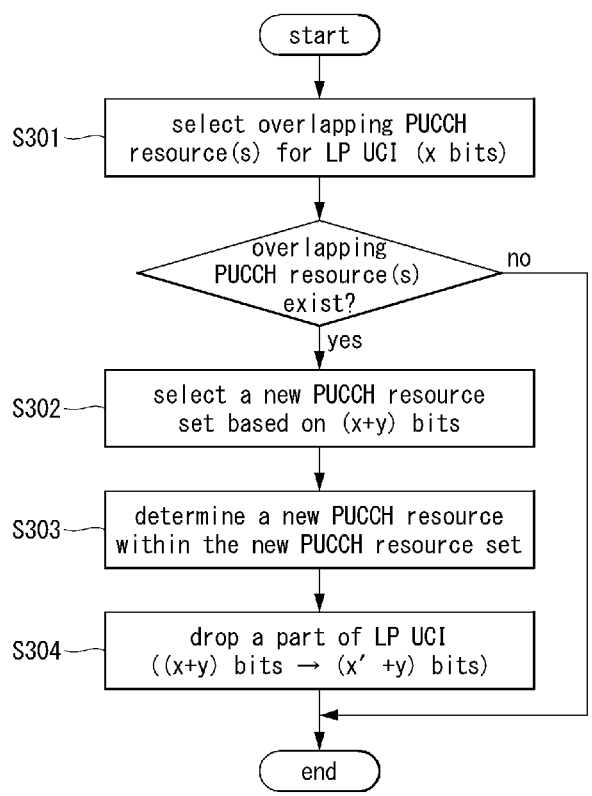
FIG. 3 is a flow chart illustrating a first exemplary embodiment of a method for determining a PUCCH resource.

FIG. 3 is a flow chart illustrating a first exemplary embodiment of a method for determining a PUCCH resource.

Referring to FIG. 3, the terminal may determine a PUCCH resource in which HP UCI is transmitted based on a technical specification. The size of the HP UCI may be y bits. The terminal may determine whether all or part of PUCCH resources corresponding to LP UCI overlap with the PUCCH resource including the HP UCI in the time domain. The terminal may select the most advanced PUCCH resource (e.g., overlapping PUCCH resource) from among the PUCCH resources overlapping the PUCCH resources including the HP UCI in the time domain (S301). The size of the LP UCI may be x bits. If there is no overlapping PUCCH resource(s), the method of determining the PUCCH resource may be terminated. That is, if the PUCCH resource corresponding to the LP UCI does not overlap with the PUCCH resources in the time domain, the terminal may transmit the HP UCI and all or part of the LP UCI by using the last determined PUCCH resource. If there are overlapping PUCCH resources, the terminal may select a new PUCCH resource set based on (x+y) bits (S302). The terminal may determine a new PUCCH resource within the new PUCCH resource set (S303). The new PUCCH resource may be used for transmission of the multiplexed UCIs (e.g., LP UCI+HP UCI). When necessary, the terminal may drop a part of the LP UCI (S304). In this case, LP UCI having a size of x' bits may be transmitted. That is, the size of the multiplexed UCIs may be (x'+y) bits. The terminal may determine again whether the PUCCH resource obtained by the above operation overlaps with the PUCCH resource corresponding to the LP UCI in the time domain (S301).

Figure 4:
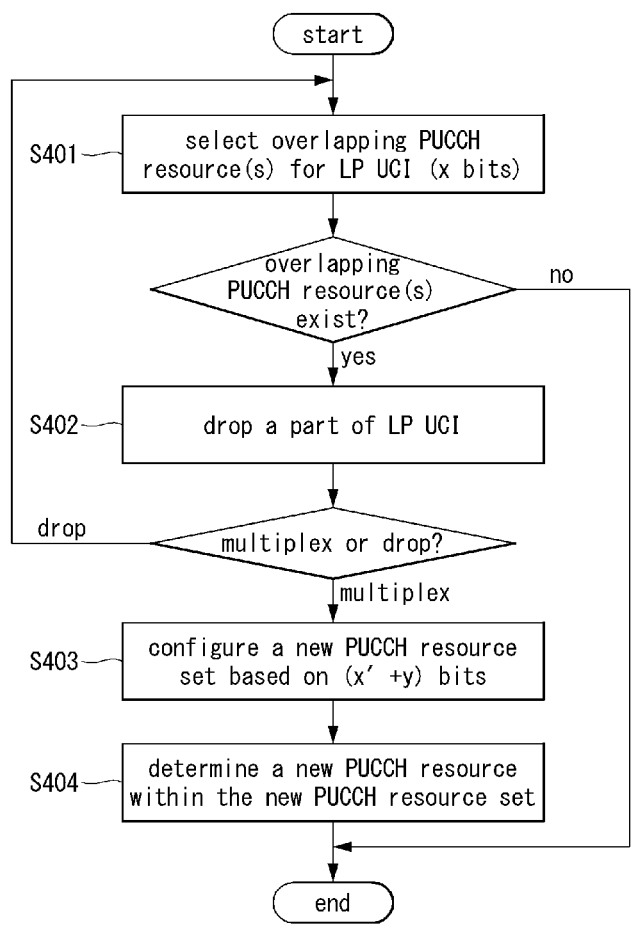
FIG. 4 is a flow chart illustrating a second exemplary embodiment of a method for determining a PUCCH resource.

FIG. 4 is a flow chart illustrating a second exemplary embodiment of a method for determining a PUCCH resource.

Referring to FIG. 4, the terminal may determine a PUCCH resource in which HP UCI is transmitted based on a technical specification. The size of the HP UCI may be y bits. The terminal may determine whether all or part of PUCCH resources corresponding to LP UCI overlap with the PUCCH resource including the HP UCI in the time domain. The terminal may select the most advanced PUCCH resource (e.g., overlapping PUCCH resource) from among the PUCCH resources overlapping the PUCCH resource including the HP UCI in the time domain (S401). If there is no overlapping PUCCH resource(s), the method of determining the PUCCH resource may be terminated. If overlapping PUCCH resources exist, the terminal may perform a step S402. In the step S402, the terminal may drop a part of the LP UCI as needed. In addition, the terminal may not consider the PUCCH resource corresponding to the part of the LP UCI. Therefore, the terminal may not derive a new PUCCH resource. If a PUCCH resource derived in the previous step exists, the terminal may maintain the corresponding PUCCH resource. When a part of the LP UCI is dropped, the size of the remaining LP UCI may be x'. In the step S402, effective LP UCI may be derived, and x' may be the size of the effective LP UCI. When it is determined not to multiplex the LP UCI and the HP UCI (e.g., when it is determined that transmission of the LP UCI is dropped), the terminal may perform again from the step S401. When it is determined to multiplex the LP UCI and the HP UCI, the terminal may perform a step S403.

The terminal may configure a new PUCCH resource set based on (x'+y) bits (S403). y bits may be the size of HP UCI. The terminal may determine a new PUCCH resource within the new PUCCH resource set (S404). The new PUCCH resource may be used for transmission of multiplexed UCIs (e.g., LP UCI+HP UCI). When the S404 is completed, the terminal may perform again from the step S401.

The exemplary embodiment shown in FIG. 3 may correspond to Method 2.1-2, and the exemplary embodiment shown in FIG. 4 may correspond to Method 2.1-3. In the exemplary embodiment shown in FIG. 3, in order to reduce the size of the LP UCI, the terminal may reduce the size of the LP UCI after determining the PUCCH resource. In the exemplary embodiment shown in FIG. 4, the terminal may determine the PUCCH resource after deriving the effective LP UCI.

The PUCCH resource derived from the multiplexing procedure of the LP UCI may overlap with another PUCCH resource. In this case, the terminal may perform the multiplexing procedure again. When the PUCCH resource derived from the multiplexing procedure of the LP UCI overlaps the PUCCH resource including the HP UCI, the terminal may select LP UCI again.

2.1.1: Methods for Solving a Problem that a PUCCH Resource for LP UCI Overlaps with a PUCCH Resource Including HP UCI Again.

The PUCCH resource considered in the multiplexing procedure or selection procedure of the HP UCI and the LP UCI may overlap another PUCCH resource in the time domain. The terminal may derive a new PUCCH resource for transmitting all or part of the UCI by solving the problem of overlapping PUCCH resources.

The PUCCH resource determined in the multiplexing procedure of the LP UCI may overlap with a PUCCH resource related to another HP UCI in the time domain. In this case, even when the PUCCH resource for multiplexing of the LP UCI and/or the HP UCI is determined, the terminal may consider multiplexing with new HP UCI. The reason is that the derived PUCCH resource occupies many symbols in the time domain, so that it may overlap with a PUCCH resource located in another (sub)slot in the time domain. Accordingly, the terminal may perform the UCI multiplexing and selection procedure again, and all of the LP UCI, a part of the LP UCI, or some types of the LP UCI may be dropped as a result of the multiplexing and selection procedure.

In order to determine the UCI size in the step of determining the PUCCH resource, the terminal may repeat the procedure for re-considering the PUCCH resource. According to such the operations, the amount of calculation may be increased. Therefore, when the terminal determines the UCI size and/or PUCCH resource, it may be preferable not to re-calculate the UCI size and/or PUCCH resource.

In order to solve the above-described problem, it may be preferable that the PUCCH resource in which the LP UCI and/or the HP UCI are multiplexed is indicated by HP DCI. This operation may be referred to as Method 2.2-1 or Method 2.2-2, which will be described later. According to Method 2.2-2, a PUCCH resource to which the HP UCI is mapped may not cross a (sub)slot boundary in the time domain. Therefore, it may be interpreted that one PUCCH resource is defined for each (sub)slot. Since the PUCCH resource considered for multiplexing the HP UCI and the LP UCI does not cross a (sub)slot boundary, the corresponding PUCCH resource may not overlap with a new PUCCH resource including new HP UCI in the time domain.

Alternatively, the operation of the terminal may be configured so that the above-described situation (e.g., the situation in which PUCCH resources overlap) does not occur in the terminal. The terminal may not perform additional calculation, and the serving base station may indicate to the terminal a PUCCH resource to which all HP UCIs are mapped or a PUCCH resource to which HP UCI is not mapped. That is, when the additional multiplexing operation of the LP UCI is performed, it may be assumed that the PUCCH resource indicated by the terminal or the PUCCH resource derived from the terminal does not overlap PUCCH resource(s) to which HP UCI is mapped more than once in the time domain.

On the other hand, when HP UCI and LP UCI are multiplexed, a method of considering a separate PUCCH resource set or a method of not selecting a PUCCH resource set according to the UCI size may be considered.

Figure 5:
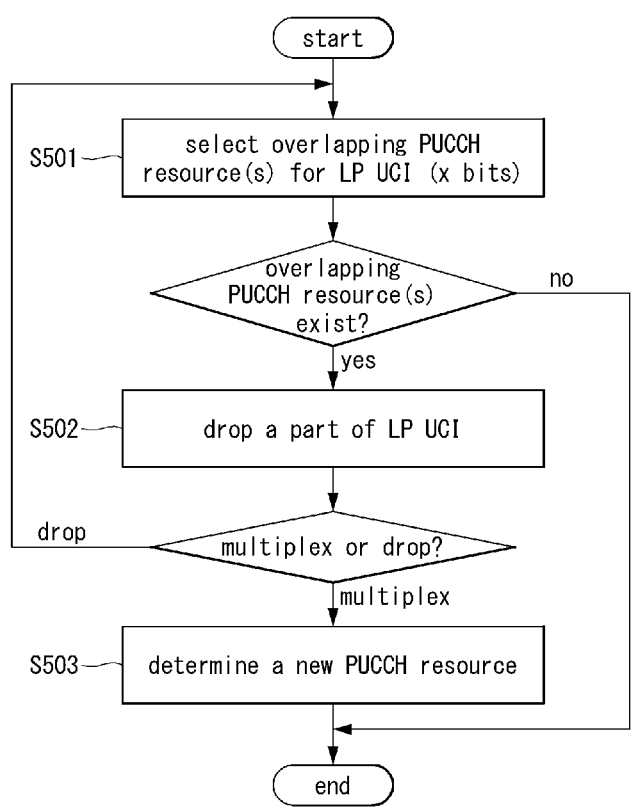
FIG. 5 is a flow chart illustrating a third exemplary embodiment of a method for determining a PUCCH resource.

FIG. 5 is a flow chart illustrating a third exemplary embodiment of a method for determining a PUCCH resource.

Referring to FIG. 5, the terminal may determine a PUCCH resource in which HP UCI is transmitted based on a technical specification. The size of the HP UCI may be y bits. The terminal may determine whether all or part of PUCCH resources corresponding to LP UCI overlap with the PUCCH resource including the HP UCI in the time domain. The terminal may select the most advanced PUCCH resource (e.g., overlapping PUCCH resource) from among the PUCCH resources overlapping the PUCCH resource including the HP UCI in the time domain (S501). The size of the LP UCI may be x bits. If a first overlapping PUCCH resource does not exist, the method of determining the PUCCH resource may be terminated. If the first overlapping PUCCH resource exists, the terminal may perform a step S502. In the step S502, the terminal may drop a part of the LP UCI as needed. In addition, the terminal may not consider a PUCCH resource corresponding to a part of the LP UCI. Therefore, the terminal may not derive a new PUCCH resource. If a PUCCH resource derived in the previous step exists, the terminal may maintain the corresponding PUCCH resource. When a part of the LP UCI is dropped, the size of the remaining LP UCI may be x'. In the step S502, effective LP UCI may be derived, and x' may be the size of the effective LP UCI. When it is determined not to multiplex the LP UCI and the HP UCI (e.g., when it is determined that transmission of the LP UCI is dropped), the terminal may perform again from the step S501. When it is determined to multiplex the LP UCI and the HP UCI, the terminal may perform a step S503. In the step S503, the terminal may determine a new PUCCH resource. The new PUCCH resource may be used for transmission of multiplexed UCIs (e.g., LP UCI+HP UCI). When the step S503 is completed, the terminal may perform again from the step S501.

In the method of determining the PUCCH resource shown in FIG. 5, the procedure for calculating the HP UCI size and the LP UCI size to determine the PUCCH resource set may be omitted. The method of determining the PUCCH resource shown in FIG. 5 may be subdivided into Method 2.1-4 and Method 2.1-5.

Method 2.1-4: When HP UCI and LP UCI are configured to be multiplexed, the base station may configure a separate PUCCH resource set to a terminal, and the terminal may consider a PUCCH resource index or PRI within the PUCCH resource set configured by the base station.

The serving base station may instruct (e.g., configure) the terminal to multiplex HP UCI and LP UCI by using RRC signaling. In this case, the serving base station may indicate (e.g., configure) a new PUCCH resource set to the terminal by using RRC signaling. An encoding scheme (e.g., Reed Muller, Polar, Simplex, etc.) may vary depending on the UCI size, and a block error rate (BLER) required according to the UCI size may be different. Therefore, the PUCCH resource set may be classified by the UCI size. The above-described operations may be applied when considering only UCIs having the same priority.

When the base station instructs the terminal to multiplex LP UCI and HP UCI, UCIs having different required BLERs may be multiplexed in one PUCCH resource. In this case, it may be preferable to introduce a new PUCCH resource set.

Method 2.1-5: The terminal may apply a PRI or PUCCH resource index in one PUCCH resource set regardless of a UCI size.

The PUCCH resource set introduced by the base station may be intended not to be multiplexed more than twice with a PUCCH resource related to HP UCI. For example, a time resource of the PUCCH resource may be configured to always be included in one (sub)slot. Therefore, a PUCCH resource used by the terminal for transmission may be multiplexed with a PUCCH resource related to one or less HP UCI.

A codeword of the LP UCI may be different from a codeword of the HP UCI. Alternatively, the LP UCI and the HP UCI may be encoded into one codeword, but information bits of the LP UCI may be different from information bits of the HP UCI. According to Method 2.1-5, when the codeword of the LP UCI is different from the codeword of the HP UCI and the terminal applies a PRI indicated by DCI or RRC signaling, the terminal may use a specific PUCCH resource set. Therefore, a procedure for selecting a separate PUCCH resource set may be unnecessary.

When the LP UCI and the HP UCI are configured as one codeword, in order to follow Method 2.1-5, the terminal may derive a value based on the HP UCI size and/or the LP UCI size, and use the value to determine a PUCCH resource set.

According to Method 2.1-5, when the length of the information bits (e.g., information bits of the HP UCI, information bits of the LP UCI, or information bits in which the HP UCI and the LP UCI are concatenated) is longer or shorter than a certain length, PUCCH formats thereof may be different. In this case, the terminal may add certain bit(s) to the information bits so that the length of the corresponding information bits is always not shorter than the certain length. For example, the terminal may increase the length of the information bits to 11 bits by adding 0(s) or 1(s) to the information bits. As another example, the terminal may increase the length of the information bits to 12 bits or more by adding 0(s) or 1(s) to the information bits. Therefore, PUCCH resource(s) belonging to the PUCCH resource set indicated to the terminal may not include a specific PUCCH format. For example, the serving base station may indicate to the terminal a PUCCH resource set consisting of a PUCCH format 2, PUCCH format 3, and/or PUCCH format 4.

2.1.2: Exemplary Embodiment Using a Legacy Set

When the size of LP UCI is nLP bits and the size of HP UCI is nHP bits, in order to determine a PUCCH resource set to which a PUCCH resource in which the LP UCI and the HP UCI are multiplexed belongs, the terminal may use a value derived from nLP and/or nHP. Each of nLP and nHP may be a natural number.

Method 2.1-6: In a procedure of selecting a PUCCH resource set, LP UCI and HP UCI may be considered as having the same weight. Accordingly, a case in which nLP+nHP exceeds a predetermined threshold may be considered.

nLP may be 1, and nHP may be 1. In this case, nLP+nHP may be regarded as 2. Therefore, all PUCCH resources belonging to the PUCCH resource set may be used for the PUCCH format 0 and/or PUCCH format 1. The terminal may assume that the importance of the LP UCI is the same as that of the HP UCI. In this case, the LP UCI may also be considered to have a high priority. Alternatively, the terminal may transmit only the HP UCI and may drop the LP UCI.

nLP may be 2 or less, nHP may be 2 or less, and nLP+nHP may be 3 or more. In this case, the terminal may select a PUCCH resource having the PUCCH format 2, PUCCH format 3, or PUCCH format 4 from the PUCCH resource set. When a codeword of the LP UCI is different from a codeword of the HP UCI, a code rate may be applied as a value indicated by RRC signaling.

When the nLP and nHP have values other than the above-mentioned values, the terminal may apply a code rate indicated by the base station (e.g., code rate indicated by RRC signaling) to generate the codeword of the LP UCI, the codeword of the HP UCI, or one codeword for the LP UCI and the HP UCI.

Method 2.1-7: In a procedure of selecting a PUCCH resource set, LP UCI and HP UCI may be considered as having different weights. Therefore, nLP and nHP may be corrected in consideration of the code rate, and a case where (nLP corrected considering the code rate+nHP corrected considering the code rate) exceeds a predetermined threshold may be considered.

nLP may be 1, and nHP may be 1. In this case, the terminal may multiplex UCIs having a size of 2 bits (e.g., LP UCI+HP UCI) based on the PUCCH format 0 or format 1. Alternatively, the terminal may express the HP UCI (or LP UCI) by using a cyclic shift, and may express the LP UCI (or HP UCI) by using a physical resource block (PRB) selection. Alternatively, the terminal may transmit only the HP UCI and may drop transmission of the LP UCI.

nLP may be 1, and nHP may be 2. Alternatively, nLP may be 2 and nHP may be 1. In this case, the terminal may express the HP UCI by using a cyclic shift based on the PUCCH format 0 or PUCCH format 1, and may express the LP UCI by using a PRB selection. Alternatively, the terminal may transmit only the HP UCI and may drop transmission of the LP UCI. Alternatively, when the codeword of the HP UCI is different from the codeword of the LP UCI or when the codeword of the HP UCI is the same as the codeword of the LP UCI, the terminal may transmit multiplexed UCIs (e.g., HP UCI+LP UCI) in a PUCCH resource having the PUCCH format 2, PUCCH format 3, or PUCCH format 4. In this case, a repetition code or a simplex code may be applied. When necessary, a simplex code with '0' added or a Reed Muller code may be applied.

When nLP and nHP have values other than the above-mentioned values, the terminal may apply a code rate indicated by the base station to generate the codeword of the LP UCI, the codeword of the HP UCI, or one codeword for the LP UCI and the HP UCI. When each codeword is generated, the terminal may determine whether a value obtained by summing values obtained by dividing the respective codeword sizes by the corresponding respective code rates indicated by the base station exceeds a certain threshold. Here, the code rate of the LP UCI may be expressed as rLP, and the code rate of the HP UCI may be expressed as rHP.

For example, the terminal may determine a PUCCH resource set by using a value determined based on nLP/rLP and nHP/rHP (e.g., nLP/rLP+nHP/rHP). In this case, nLP/rLP+nHP/rHP may not be an integer. The terminal may generate each codeword and transmit each codeword by using the PUCCH format 2, PUCCH format 3, or PUCCH format 4.

As another example, nHP+nLP×g may be defined, and g may be determined as a ratio of rLP to rHP. The value of g may not be an integer. The terminal may generate each codeword and transmit each codeword by using the PUCCH format 2, PUCCH format 3, or PUCCH format 4.

Here, nLP may be interpreted as the size of the LP UCI or the size of 'LP UCI+cyclic redundancy check (CRC)', and nHP may be interpreted as the size of HP UCI or the size of 'HP UCI+CRC'.

The terminal may determine a PUCCH resource set by using a value obtained by applying Method 2.1-7. That is, the terminal may select one PUCCH resource set from among PUCCH resource sets.

One PUCCH resource set may include a plurality of PUCCH resources. Accordingly, the terminal may receive a PUCCH resource index from the base station, and may select one PUCCH resource capable of transmitting UCI (e.g., LP UCI and/or HP UCI) based on the PUCCH resource index.

Here, the base station may transmit PUCCH configuration information (e.g., PUCCH format or PUCCH resource) including a code rate applied to each UCI to the terminal. The terminal may identify the code rate applied to each UCI based on the PUCCH configuration information received from the base station. The code rate of the LP UCI and the code rate of the HP UCI may be set by the base station. The code rate of the LP UCI may be set independently of the code rate of the HP UCI.

2.2: Methods for Determining a PUCCH Resource when DCI is Received

The terminal may receive a plurality of DCIs. DCI indicating transmission of LP UCI may be received relatively early. The DCI may indicate reception of a PDSCH and transmission of a PUCCH, and may include an offset of a (sub)slot in which the PUCCH is transmitted.

The base station may transmit an RRC message and/or DCI (e.g., a field included in the DCI) indicating multiplexing of HP UCI and LP UCI to the terminal. The terminal may identify that multiplexing of HP UCI and LP UCI is indicated based on the DCI and/or the RRC message received from the base station. For example, one value in the RRC message or one value in the field of the DCI may indicate multiplexing of HP UCI and LP UCI. A different value in the RRC message or a different value in the field of the DCI may indicate that HP UCI and LP UCI are not multiplexed.

As another example, one value of a field indicating a beta offset included in the DCI may indicate that HP UCI and LP UCI are not multiplexed. For example, when the beta offset for the LP UCI has 0, the LP UCI may not be multiplexed. In this case, the terminal may transmit only the HP UCI. That is, transmission of the LP UCI may be dropped.

Method 2.2-1: HP DCI may indicate multiplexing of LP UCI and HP UCI.

DCI including a field indicating multiplexing of HP UCI and LP UCI may be non-fallback DCI (e.g., DCI format other than the DCI format 1_0) and/or HP DCI. For example, when a priority field included in DCI received from the terminal indicates a low priority (e.g., 0), the terminal may ignore the value of the field indicating the multiplexing of HP UCI and LP UCI. On the other hand, when the priority field included in the DCI received from the terminal indicates a high priority (e.g., 1), the terminal may generate a PUCCH according to the value of the field indicating the multiplexing of HP UCI and LP UCI.

For example, in DCI scheduling a PUSCH, a total-downlink assignment index (T-DAI) of HP UCI and a T-DAI of LP UCI may be independently indicated. To support this operation, the size of the T-DAI field may be doubled. When the base station instructs the terminal to generate a T1 HARQ codebook, the terminal may multiplex UCI having the corresponding priority in the PUSCH according to the value of the T-DAI. Alternatively, the terminal may drop transmission of the UCI having the corresponding priority according to the value of the T-DAI. When the base station instructs the terminal to generate a T2 HARQ codebook, a field other than the T-DAI field in the DCI may indicate multiplexing or dropping of transmission of the UCI transmission having the corresponding priority. Here, the UCI may be multiplexed in the PUSCH.

Method 2.2-2: The terminal may apply a PRI indicated by HP DCI.

A PUCCH resource in which LP UCI and HP UCI are multiplexed may be indicated by HP DCI. The target BLER of the HP UCI may be different from the target BLER of the LP UCI. If the HP UCI is transmitted as being included in a PUCCH resource derived from the PRI indicated by LP DCI, the base station may achieve a high BLER. The terminal may obtain one codeword by encoding information bits of the LP UCI and information bits of the HP UCI. Alternatively, the codeword of the LP UCI may be different from the codeword of the HP DCI. The PUCCH resource (e.g., resource elements (REs)) indicated by the LP DCI may not be sufficient. For example, insufficient REs may be allocated for the codeword of the HP UCI. However, the PRI included in the HP DCI may indicate a PUCCH resource so that a sufficient number of REs are allocated for at least the codeword of the HP UCI.

For example, both Method 2.2-1 and Method 2.2-2 may be applied to the HP DCI received by the terminal. Information required for PUCCH transmission may be indicated by the HP DCI. For example, HP DCI may include information indicating whether the LP UCI is multiplexed, the PRI for the HP UCI, and/or the PRI for the LP UCI and the HP UCI when the LP UCI is multiplexed.

Method 2.2-3: The terminal may apply a PRI of the last received DCI.

DCI that the terminal determines to have been most recently received may be HP DCI or LP DCI. The terminal may receive a plurality of DCIs and may multiplex LP UCI and/or HP UCI in the same PUCCH. In this case, the terminal may select the last DCI received in the time domain from among the plurality of DCIs. When carrier aggregation (CA) is configured, the terminal may receive two or more DCIs from control resource sets (CORESETs) starting from the same symbol. When two or more DCIs are last received in the time domain, the terminal may select one DCI from among the two or more DCIs based on CORESET IDs, search space set IDs, or DAIs of the DCIs. For example, the DCI selected by the terminal may be DCI received from the CORESET having the lowest ID, DCI received from the search space set having the lowest ID, or DCI having the highest DAI. The base station may derive an appropriate PRI to indicate multiplexing of the LP UCI and/or the HP UCI. Therefore, the terminal may apply the PRI of the last received DCI in the time domain.

Method 2.2-4: The terminal may apply a PRI of the LP DCI.

The terminal may apply the PRI of the LP DCI. The HP UCI may be coded, and the coded HP UCI may be multiplexed in a PUCCH to which the PRI of the LP DCI is applied. In this case, the codeword of the LP UCI may be multiplexed with the codeword of the HP UCI by puncturing or rate matching.

Figure 6:
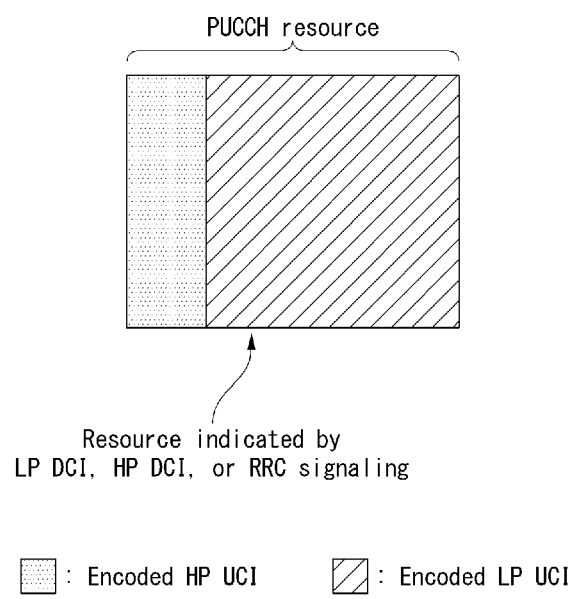
FIG. 6 is a conceptual diagram illustrating a first exemplary embodiment of a method of multiplexing LP UCI and HP UCI in a PUCCH resource.

FIG. 6 is a conceptual diagram illustrating a first exemplary embodiment of a method of multiplexing LP UCI and HP UCI in a PUCCH resource.

Referring to FIG. 6, a codeword of HP UCI (e.g., encoded HP UCI) may be modulated and mapped to some resources of a PUCCH resource indicated by LP DCI, HP DCI, or RRC signaling. A codeword of LP UCI may be modulated and mapped to the remaining resources of the PUCCH resource. The PUCCH resource may be configured for each hop, and demodulation-reference signal (DM-RS) resources are omitted from the PUCCH resource shown in FIG. 6. The encoded LP UCI may be LP UCI on which puncturing or rate matching is performed.

Although the HP UCI and the LP UCI are mapped to different symbols in the exemplary embodiment shown in FIG. 6, the present disclosure may not necessarily be limited to the above-described exemplary embodiment. Depending on the relative amounts of the HP UCI and the LP UCI, both the encoded HP UCI and the encoded LP UCI may be mapped in the same symbol(s). In this case, the encoded HP UCI and the encoded LP UCI may be mapped to all PRBs belonging to the PUCCH resource in order to achieve a frequency multiplexing gain.

In the exemplary embodiment shown in FIG. 6, the PUCCH format 2, PUCCH format 3, and/or PUCCH format 4 may be applied. When the PUCCH format 4 is used, since the PUCCH format 4 is spread and mapped in the frequency domain, the codeword of the HP UCI may also be spread and mapped in the frequency domain.

Method 2.2-5: When Method 2.2-4 is applied, the terminal may apply the PRI of the LP DCI or the PRI of HP the DCI according to the PUCCH format indicated by the PRI of the LP DCI.

The PM of the LP DCI may indicate a PUCCH resource and a PUCCH format. When the PUCCH format 0 or PUCCH format 1 is indicated by the PRI of the LP DCI, the terminal may multiplex only 1 bit or 2 bits of UCI. In this case, the terminal may determine a PUCCH resource set based on the size of the LP UCI. Therefore, when a sum of the sizes of the LP UCI and the HP UCI is 3 bits or more, the PRI of the LP DCI may not be applied. In this case, the terminal may not be able to perform Method 2.2-4. On the other hand, when the PUCCH format 2, PUCCH format 3, or PUCCH format 4 is used and the size of the UCI is 3 bits or more, the terminal may multiplex the UCI. Therefore, the terminal may apply the PRI of the LP DCI and may additionally multiplex the HP UCI. In the procedure of transmitting the LP DCI, the base station may know the size of the LP UCI. In this case, since HP UCI may additionally occur in the terminal, the base station may determine the PUCCH resource by predicting the size of the HP UCI.

In order to improve the above-described operation, when the PRI of the LP DCI indicates the PUCCH format 0 or PUCCH format 1, since the terminal cannot multiplex the HP UCI, the terminal may multiplex the LP UCI and the HP UCI by applying the PRI of the HP DCI.

Method 2.2-6: When Method 2.2-4 is applied, according to a PUCCH format indicated by the PRI of the LP DCI, the terminal may transmit the LP UCI and the HP UCI by applying the PRI of the LP DCI. Alternatively, the terminal may drop transmission of the LP UCI, and may transmit only the HP UCI by applying the PRI of the HP DCI.

The PRI of the LP DCI may indicate a PUCCH resource and a PUCCH format. When the LP DCI indicates the PUCCH format 0 or PUCCH format 1, it may be difficult to multiplex HP UCI and the LP UCI having the PUCCH format 0 or PUCCH format 1. That is, for multiplexing of the HP UCI and the LP UCI, the PUCCH format may be preferably indicated as the PUCCH format 2, PUCCH format 3, or PUCCH format 4. Therefore, when the LP DCI indicates the PUCCH format 0 or PUCCH format 1, the terminal may drop the LP UCI to transmit the HP UCI. That is, the terminal may transmit only the HP UCI for the HP DCI regardless of the LP DCI. This operation may be interpreted as an operation in which the terminal compares a priority of a PUCCH including only the LP UCI with a priority of a PUCCH including only the HP UCI, and transmits only the PUCCH including only the HP UCI according to a result of the comparison.

The terminal may transmit only the HP UCI or both the LP UCI and the HP UCI according to indication of RRC signaling, the HP DCI, or the LP DCI.

2.2.1: Exemplary Embodiment in which Fallback DCI is Received

A specific DCI format may not include a field indicating multiplexing of LP UCI and HP UCI. In this case, the LP UCI and the HP UCI may not be multiplexed, and the terminal may transmit only the HP UCI on a PUCCH.

A specific DCI format may not include a field to distinguish between LP UCI and HP UCI. In this case, a priority of the specific DCI format may be defined in a technical specification. Alternatively, the priority of the specific DCI format may vary according to a search space set in which the specific DCI format is transmitted.

When a PUCCH resource is indicated by LP DCI and the LP DCI has the DCI format 1_0 (e.g., fallback DCI), the terminal may not multiplex the LP UCI and the HP UCI. In this case, the terminal may transmit only the HP UCI on a PUCCH.

When a PUCCH resource is indicated by HP DCI and the HP DCI has the DCI format 1_0 (e.g., fallback DCI), the LP UCI and the HP UCI may not be multiplexed. In this case, the terminal may transmit only the HP UCI on a PUCCH.

When the last DCI affecting transmission of a PUCCH is fallback DCI (e.g., DCI format 1_0), the LP UCI and the HP UCI may not be multiplexed. In this case, the terminal may transmit only the HP UCI on a PUCCH.

2.3: Methods for Determining a PUCCH Resource when DCI is not Received

DCI may not be received at the terminal, and the terminal may transmit a HARQ-ACK for a PDSCH indicated by RRC signaling or may transmit a PUCCH indicated by RRC signaling. A priority of an SR and/or a priority of an LRR may be determined by RRC signaling. A priority of CSI may be regarded as a priority of LP UCI. A priority of a semi-persistent scheduling (SPS) PDSCH may be determined by RRC signaling or DCI (hereinafter referred to as 'activating DCI') that activates the SPS PDSCH. Therefore, the terminal may predict a time resource in which HP UCI or LP UCI indicated by RRC signaling are multiplexed and/or types of multiplexed UCIs.

Method 2.3-1: When transmission of UCI is determined by RRC signaling or activating DCI, whether to multiplex HP UCI and LP UCI may be indicated by the corresponding RRC signaling or activating DCI.

HP UCI and LP UCI having different periodicities may be transmitted on a PUCCH. In this case, transmission of the HP UCI and transmission of the LP UCI may occur in the same symbol(s). In this case, the terminal may transmit only the HP UCI or the multiplexed HP UCI and LP UCI according to RRC signaling.

The SPS PDSCH may be configured by RRC signaling and may be activated by activating DCI. The terminal may receive the SPS PDSCH in a periodic time resource. For example, one field of the activating DCI may indicate whether to multiplex the HP UCI and the LP UCI. As another example, information included in the RRC message for configuring the SPS PDSCH may indicate whether to multiplex the HP UCI and the LP UCI.

Method 2.3-2: When HP UCI and LP UCI are multiplexed in Method 2.3-1, the terminal may generate one codeword by concatenating the HP UCI and the LP UCI. Alternatively, the terminal may multiplex a codeword of the HP UCI and a codeword of the LP UCI. Here, the codeword of the HP UCI may be different from the codeword of the LP UCI.

If the HP UCI or LP UCI is too short, the terminal may append known bit(s) to the HP UCI or LP UCI having a short length, and then may perform an encoding procedure for the corresponding UCI. In this case, the increased length of the UCI may be 3 bits or 12 bits.

When the HP UCI and the LP UCI are multiplexed, since the size of UCI (e.g., multiplexed UCIs) transmitted on a PUCCH increases, a separate PUCCH resource may be defined. For example, in order to transmit a HARQ-ACK of an SPS PDSCH, the terminal may determine a PUCCH resource by performing a step of determining the size of the UCI. If the size of the LP UCI is N bits and the size of the HP UCI is M bits, the terminal may independently derive a PUCCH resource for transmitting N bits and a PUCCH resource for transmitting M bits. A PUCCH resource set to which the PUCCH resource for transmitting N bits belongs may be different from a PUCCH resource set to which the PUCCH resource for transmitting M bits belongs. Each of N and M may be a natural number.

Therefore, in order to multiplex the HP UCI and the LP UCI, different PUCCH resources may be derived. A code rate applied to the HP UCI may be different from a code rate applied to the LP UCI. Therefore, it may not be preferable to derive a PUCCH resource for transmitting (N+M) bits.

Method 2.3-3: When HP UCI and LP UCI are multiplexed in Method 2.3-1, the terminal may select PUCCH resource(s) within a separate PUCCH resource set. Here, a PUCCH format for the PUCCH resource(s) may be limited to a specific format (e.g., PUCCH format 2, PUCCH format 3, or PUCCH format 4).

2.3.1: Methods for Multiplexing HARQ-ACK for SPS PDSCH, CSI, and/or SR

An SR may correspond to a PUCCH resource on a one-to-one basis, and a PUCCH including the SR may have the PUCCH format 0 or PUCCH format 1. The higher layer of the terminal may deliver only one SR to the physical layer of the terminal. Accordingly, the terminal may transmit one SR in a PUCCH resource. After an SR (e.g., LP SR) having a priority A is delivered to the physical layer, an SR (e.g., HP SR) having a higher priority (e.g., priority B) than the priority A may occur. In this case, the higher layer of the terminal may deliver the HP SR again to the physical layer of the terminal. When a PUCCH resource for transmission of the LP SR overlaps with a PUCCH resource for transmission of the HP SR in the time domain (e.g., the same symbol(s)), the terminal may transmit only the HP SR. That is, transmission of the LP SR may be dropped.

Then, transmission of CSI may be considered. The base station may indicate (or configure) a PUCCH resource for transmission of CSI to the terminal by using RRC signaling. The terminal may identify the PUCCH resource indicated by the base station, and may map encoded CSI to the PUCCH resource. If the PUCCH resource indicated by the base station (e.g., resource for transmission of the CSI) overlaps with a resource for transmission of another UCI or data, the terminal may multiplex the CSI and another UCI or multiplex the CSI and the data. Here, another UCI may include a HARQ-ACK for an SPS PDSCH and/or an SR. If another UCI is a HARQ-ACK for a PDSCH indicated by DCI, the terminal may determine a PUCCH resource based on a PRI of the DCI. Alternatively, when the data is a PUSCH indicated by DCI, the terminal may determine a PUSCH resource based on a PRI of the DCI.

In the CSI transmission procedure, a plurality of CSI reports may be multiplexed. To support this operation, the base station may transmit a PUCCH resource list to the terminal by using RRC signaling, and the terminal may obtain the PUCCH resource list from the base station. For example, the PUCCH resource list may include two PUCCH resources. The terminal may select one PUCCH resource belonging to the PUCCH resource list according to the size of the CSI report.

A priority of CSI may be considered as a low priority. For example, UCI including CSI may be LP UCI. An SPS PDSCH may have a high priority or a low priority according to indication of the base station. A priority of a HARQ-ACK for an SPS PDSCH (hereinafter, referred to as 'SPS HARQ-ACK') may follow a priority of the SPS PDSCH. In exemplary embodiments, a CSI/SPS HARQ-ACK may include 'CSI', 'SPS HARQ-ACK with a low priority', or 'CSI and SPS HARQ-ACK with a low priority'.

A CSI/SPS HARQ-ACK and a LP SR may occur, and PUCCH resources corresponding to the CSI/SPS HARQ-ACK and LP SR may share the same symbol(s). In this case, the terminal may generate one information bits by concatenating the CSI/SPS HARQ-ACK and the LP SR, and may derive one codeword by performing the same encoding procedure for the one information bits. The one codeword may be mapped to a PUCCH resource. A CSI/SPS HARQ-ACK and a HP SR may occur, and PUCCH resources corresponding to the CSI/SPS HARQ-ACK and HP SR may share the same symbol(s). In this case, the terminal may transmit only the HP SR and may not transmit the CSI/SPS HARQ-ACK. A CSI/SPS HARQ-ACK, a LP SR, and a HP SR may occur, and PUCCH resources corresponding to the CSI/SPS HARQ-ACK, LP SR, and HP SR may share the same symbol(s). In this case, the terminal may transmit only the HP SR and may not transmit the CSI/SPS HARQ-ACK and the LP SR.

The base station may indicate (e.g., configure) multiplexing of HP UCI and LP UCI to the terminal. Here, PUCCH resources associated with the CSI/SPS HARQ-ACK and LP SR may have the same symbol(s), PUCCH resources associated with the CSI/SPS HARQ-ACK and HP SR may have the same symbol(s), and PUCCH resources associated with the CSI/SPS HARQ-ACK, LP SR, and HP SR may have the same symbol(s).

Since each of the LP UCI and the HP UCI is independently encoded, the same UCI type may include different codewords (e.g., the codeword of the LP UCI and the codeword of the HP UCI). Therefore, the CSI/SPS HARQ-ACK and SR may be included in different codewords.

Method 2.3-4: A CSI/SPS HARQ-ACK and an SR/LRR (e.g., HP SR/LRR and/or LP SR/LRR) may belong to different codewords.

A code rate applied to the CSI/SPS HARQ-ACK may be a code rate applied to the LP UCI, and a code rate applied to the HP SR and LP SR may be a code rate applied to the HP UCI. When information bits are generated by concatenating the HP SR and the LP SR, a state in which an SR does not occur in the terminal may be expressed as only one case.

Meanwhile, according to Method 2.3-2, different encoding procedures may be performed for the CSI/SPS HARQ-ACK (or 'CSI/SPS HARQ-ACK and LP SR') and the HP SR, and independent codewords may be derived by the different encoding procedures. The independent codewords may be mapped to one PUCCH resource. Therefore, the CSI/SPS HARQ-ACK or the CSI/SPS HARQ-ACK and LP SR' may be derived as one codeword, and the HP SR may be derived as another codeword. The derived codewords may be mapped to a PUCCH resource. In order to map the codeword of the HP SR, a puncturing operation or a rate matching operation may be performed on the codeword of the CSI/SPS HARQ-ACK or the codeword of the CSI/SPS HARQ-ACK and LP SR'.

PUCCH resources for kHP HP SRs may overlap in the same symbol(s), and PUCCH resources for kLP LP SRs may overlap in the same symbol(s). Each of kHP and kLP may be a natural number. Which SR has occurred in the terminal may be expressed. In this case, a case in which an SR does not occur in the terminal may also be expressed.

Method 2.3-5: When a LP SR and a HP SR are concatenated and included in one codeword, information bits in which the LP SR and the HP SR are concatenated may be expressed as ceiling(log 2(1+kLP+kHP)) bits.

Here, 1 may mean a case in which an SR does not occur in the terminal. In order to express an SR regardless of priority, (1+kLP+kHP) cases may be expressed.

Method 2.3-6: When a LP SR and a HP SR belong to different codewords, information bits of the HP SR may be expressed as ceiling(log 2(1+kHP)) bits, and information bits of the LP SR may be expressed as ceiling(log 2(1)+kLP)) bits.

A case in which no SR has occurred in the terminal may be expressed in both the HP SR and the LP SR. Therefore, the base station may determine whether the SR has occurred by decoding one of the codeword of the HP SR and the codeword of the LP SR.

On the other hand, the case in which an SR does not occur in the terminal may be regarded as LP UCI or HP UCI. In this case, the terminal may reduce the length of the information bits. When it is considered as LP UCI that an SR does not occur in the terminal, ceiling (log 2(kHP)) bits may be required to express the HP SR. When it is considered as HP UCI that an SR does not occur in the terminal, ceiling (log 2(kLP)) bits may be required to express the LP SR. When an SR is expressed in one priority, it may not be necessary to express an SR in another priority. This operation will be defined in Method 2.3-7.

Method 2.3-7: When a LP SR and a HP SR belong to different codewords, information bits of the HP SR may be expressed as ceiling(log 2(kHP)) bits, and information bits of the LP SR may be expressed as ceiling(log 2(1+kLP)) bits.

Alternatively, when the LP SR and the HP SR belong to different codewords, the information bits of the LP SR may be expressed as ceiling(log 2(kLP)) bits, and the information bits of the HP SR may be expressed as ceiling(log 2(1+kHP)) bits.

A payload may include both the LP SR and the HP SR, and the LP SR and the HP SR may have independent values. In this case, the terminal may represent a positive SR in both the LP SR and the HP SR.

2.4: Methods for Multiplexing Resources of LP UCI and HP UCI

UCI (e.g., HP UCI) or TB (e.g., HP data) having different priorities may be transmitted, and transmission of LP UCI or LP data overlapping in the time domain may be dropped.

To support this operation, UCI types having the same priority may be considered. When the UCI types overlap in the time domain, the terminal may multiplex the corresponding UCI types. One PUCCH resource may be derived by the above-described operations. Thereafter, when PUCCH resources having different priorities overlap in the time domain, transmission may be performed only in the PUCCH resource corresponding to the high priority, and transmission may be dropped in the PUCCH corresponding to the low priority.

In exemplary embodiments, overlapping of PUCCH resources in the time domain may mean collision of UCIs. An SR may mean an SR and/or an LRR.

When a HP SR and a LP SR collide (e.g., when two or more positive SRs having different priorities occur), the terminal may transmit only the HP SR.

A case where a HP SR collides with LP UCI may be considered. Here, the LP UCI may include SR, HARQ-ACK, and/or CSI. Therefore, a PUCCH resource corresponding to the LP UCI may be used for transmission of the PUCCH format 2, PUCCH format 3, or PUCCH format 4, and the SR may be included in a payload. The type of the SR (e.g., positive SR or negative SR) may be identified by 0 or 1.

The LP SR may not be multiplexed with the HP SR. According to Method 2.4-1, Method 2.4-2, and Method 2.4-3 to be described later, the HP UCI may not be multiplexed with the LP UCI. When the HP SR is multiplexed, in order not to multiplex the LP SR, the size of the LP UCI may be reduced, and a PUCCH resource determination procedure for the LP UCI having the reduced size may be performed again.

Method 2.4-1: When LP UCI including a LP SR collides with a HP SR, the terminal may transmit the HP SR and may drop transmission of the LP UCI.

Method 2.4-2: When LP UCI including a LP SR collides with a HP SR, the terminal may transmit the HP SR and may multiplex the remaining control information excluding the LP SR within the LP UCI.

When Method 2.4-2 is applied, a PUCCH resource associated with the LP UCI may be a resource in consideration of the LP SR. From the viewpoint of the payload, the LP SR may be excluded from the payload, and from the viewpoint of the PUCCH resource, the LP SR may be used in the multiplexing procedure.

When the PUCCH resource associated with the LP SR is excluded, the PUCCH resource for the UCI type except for the LP SR may be considered in the procedure for determining the PUCCH resource associated with the LP UCI. The terminal may perform a PUCCH resource determination procedure again.

Method 2.4-3: When LP UCI including a LP SR collides with a HP SR, a collision between the LP SR and the HP SR may be resolved first. When a positive HP SR occurs, a PUCCH resource associated with the LP SR may not be considered in the multiplexing procedure of the LP UCI.

This operation may mean that the MAC layer of the terminal delivers only one positive SR among the HP SR and the LP SR to the PHY layer of the terminal. If the HP SR is a positive SR, a PUCCH resource associated with the LP SR may be considered as not configured in the terminal. Thereafter, the terminal may determine one PUCCH resource by multiplexing the LP UCI. Therefore, the terminal may perform a procedure of multiplexing the LP UCI and the HP UCI or a procedure of selecting UCI (i.e., prioritization procedure).

The methods described above may be easily extended. For example, the above-described methods may be applied to HP UCI including HP SR.

Chapter 3: PUCCH Generation Method

In a procedure of generating a PUCCH, the terminal may spread UCI and map the spread UCI to a resource grid. Alternatively, the terminal may generate a codeword by performing an encoding operation on the UCI, may generate a modulated codeword by performing a modulation operation on the codeword, and may map the modulated codeword to a resource grid. Here, the modulation scheme may be quadrature phase shift keying (QPSK). However, the modulation scheme may not be limited to QPSK. For example, the modulation scheme may be set to QPSK or π/2-BPSK (binary phase shift keying) by RRC signaling.

3.1: Methods for Determining a Code Rate

LP UCI and HP UCI may be generated as different codewords. For example, the codeword of the LP UCI and the codeword of the HP UCI may be independently generated. A PUCCH format may be indicated by RRC signaling, and the terminal may determine a code rate of each of the LP UCI and the HP UCI in consideration of the PUCCH format. The code rate of the UCI may be determined by DCI or RRC signaling by which the UCI is allocated. Alternatively, the code rate of the UCI may be determined independently of the DCI or RRC signaling. When the terminal transmits two or more UCI types or UCIs having two or more priorities, a PUCCH resource set and/or PUCCH resource may be interpreted differently according to a multiplexing procedure. When the PUCCH format is changed, the code rate applied to the UCI may be changed. The code rate applied to the UCI may be indicated by the following method(s).

Method 3.1-1: The terminal may apply a code rate associated with a PUCCH format for a PUCCH resource in which UCI is transmitted.

The multiplexing procedure of the HP UCI and the LP UCI may be completed, and the PUCCH resource may be determined. In this case, the terminal may encode the LP UCI and the HP UCI by applying the code rate associated with the PUCCH format. HP DCI for generation/transmission of the HP UCI may be received at the terminal later than LP DCI for generation/transmission of the LP UCI. In this case, in order to utilize the PUCCH resource, the terminal may not perform the encoding of the LP UCI in advance. The reason is that the terminal cannot know the PUCCH format for the PUCCH resource in which the LP UCI is transmitted. However, since the code rate suitable for the PUCCH format can also be applied to the LP UCI, a BLER achieved at the base station may be sufficiently low.

As a method for solving the above problem, when the LP UCI and the HP UCI are multiplexed, the base station may transmit a PRI or PUCCH resource index to the terminal so that the PUCCH format associated with the LP UCI is always the same as the PUCCH format for multiplexing of the LP UCI and the HP UCI. Alternatively, when the PUCCH formats are indicated differently, the following method(s) may be used.

Method 3.1-2: The terminal may apply a code rate associated with a PUCCH format indicated by DCI or RRC signaling indicating (e.g., scheduling) transmission of UCI.

The code rate applied to the LP UCI may follow a code rate for a PUCCH format indicated by LP DCI or RRC signaling. Therefore, the terminal may apply the code rate applied to the LP UCI regardless of the PUCCH format (e.g., PUCCH format associated with the HP UCI) for the PUCCH resource in which the corresponding LP UCI is transmitted. Since the above method is applied even when the PUCCH resource in which the LP UCI is transmitted has a different PUCCH format from the aforementioned PUCCH format, the encoding procedure of the LP UCI may be performed in advance. When the PUCCH resource in which the HP UCI and the LP UCI are multiplexed is determined, the terminal may modulate the encoded LP UCI and map the modulation result to REs of the PUCCH resource.

For example, the PUCCH in which the LP UCI is actually transmitted may be a PUCCH1 on which the LP UCI is to be transmitted or a PUCCH2 on which the LP UCI and the HP UCI are multiplexed. If Method 3.1-1 is applied, the code rate applied to the LP UCI may be associated with a PUCCH format for the PUCCH2. If Method 3.1-2 is applied, the code rate applied to the LP UCI may be associated with a PUCCH format for the PUCCH1.

There may be two code rates for the UCI. In this case, based on Method 3.1-2, two code rates associated with the PUCCH format may be indicated. One of the two code rates may be an offset with respect to the other code rate. For example, the terminal may apply one of the two code rates to the HP UCI, and may apply the other code rate (or a code rate derived from the offset) to the LP UCI. The offset may be set by system information, RRC message, MAC CE, and/or DCI.

Method 3.1-3: Two code rates may be associated with a PUCCH format.

The code rate applied to the UCI may not be a code rate associated with the PUCCH format. The code rate may be a variable for configuring resources of the PUCCH, and may be included in configuration information of the PUCCH. In this case, the UCI may have a different code rate for each PUCCH resource.

Method 3.1-4: The code rate (or, code rate offset) applied to UCI in a PUCCH resource may be associated with one or more values.

When the code rate offset is indicated (or set), the terminal may determine the code rate by applying the offset to the code rate associated with the PUCCH format.

If UCI multiplexed in the PUCCH consists of only LP UCI or only HP UCI, one code rate may be required. In this case, the terminal may select one code rate from among the code rate associated with the PUCCH format and the code rate associated with the PUCCH resource.

Method 3.1-5: In Method 3.1-4, when the code rate for the PUCCH resource is not indicated, the terminal may apply the code rate associated with the PUCCH format, and when the code rate for the PUCCH resource is indicated, the terminal may not apply the code rate associated with the PUCCH format.

When UCI multiplexed in the PUCCH includes LP UCI and HP UCI, two code rates may be required in the terminal. Therefore, when once code rate is associated with the PUCCH resource, the terminal may apply the code rate associated with the PUCCH format together. For example, the code rate applied to the LP UCI may be the code rate associated with the PUCCH resource, and the code rate applied to the HP UCI may be the code rate associated with the PUCCH format. Alternatively, the code rate applied to the LP UCI may be the code rate associated with the PUCCH format, and the code rate applied to the HP UCI may be the code rate associated with the PUCCH resource.

When two code rates are associated with the PUCCH resource, the terminal may use only the code rates associated with the PUCCH resource. In this case, two code rates or two code rate offsets may be defined. Alternatively, one code rate and one code rate offset may be defined.

3.2: Methods of Mapping Encoded UCI

Since a modulation order is fixed, if the code rate of the UCI is determined, the number of REs to which the codeword of the UCI is mapped may be determined. In exemplary embodiments, the number of REs required to map the codeword of the LP UCI may be referred to as nLP, and the number of REs required to map the codeword of the HP UCI may be referred to as nHP. The number of independent REs that a PUCCH resource has may be referred to as n. For example, when a spreading code is applied, the number of REs before applying the spreading code rate may be n. Each of nLP, nHP, and n may be a natural number. The mapping of the codeword of the UCI to REs or the mapping of the UCI to REs may mean that modulation symbols that are a result of modulation on the codeword of the UCI are mapped to the REs.

The terminal may map the LP UCI and the HP UCI in the PUCCH, and in order to achieve a sufficiently low BLER at the base station, REs of (nLP+nHP) or more may be included in the PUCCH (e.g., PUCCH resource). The number of REs that the PUCCH resource has (e.g., the size of the PUCCH resource) may be determined by a PRI or PUCCH resource index. The number of REs of the PUCCH resource may be different from (nLP+nHP). In this case, the terminal may additionally map the codeword of the LP UCI or the codeword of the HP UCI to the PUCCH resource.

A case where rate matching is performed on the LP UCI and the HP UCI may be distinguished from a case where puncturing is performed on at least one UCI among the LP UCI and the HP UCI. When the rate matching is performed, the coded UCI may always be received by the base station. When the puncturing is performed, a part of the encoded UCI may not be received by the base station.

Method 3.2-1: For n REs of the PUCCH resource, the terminal may assume that HP UCI does not exist, may map a codeword of LP UCI according to the assumption, may map a codeword of HP UCI to nHP REs within a certain location (e.g., a certain region).

In this case, the codeword of the LP UCI may be mapped or may be able to be mapped to the nHP REs, but the codeword of the HP UCI may be mapped to the nHP REs instead of the codeword of the LP UCI. Since the base station already knows the certain location, it may extract and decode only an effective part from the codeword of the LP UCI. The base station may inform the terminal of information on the certain location by using RRC signaling, and the terminal may know that the codeword of the HP UCI is mapped in consecutive nHP REs within the certain location indicated by the base station.

Method 3.2-2: The terminal may map a codeword of LP UCI to nLP REs among RE(s) of a PUCCH resource, and may map a codeword of HP UCI to the remaining (n nLP) REs. n may be the total number of REs of the PUCCH resource.

When the PUCCH resource is indicated by HP DCI, REs required for mapping the codeword of the LP UCI may be secured, and the codeword of the HP UCI may be mapped to the remaining REs. The base station may indicate to the terminal an appropriate PUCCH resource so that sufficient REs (e.g., at least nHP REs) are allocated to the HP UCI. Therefore, a BLER experienced by the HP UCI may be minimized.

If the terminal receives the LP DCI first and then receives the HP DCI, a range of n considering nLP may be defined, and the HP DCI may indicate a PUCCH resource satisfying the range of n.

Method 3.2-3: The terminal may map a codeword of HP UCI to nHP REs among RE(s) of a PUCCH resource, and may map a codeword of LP UCI to the remaining (n−nHP) REs. n may be the total number of REs of the PUCCH resource.

The number of REs (e.g., n) of the PUCCH resource may not be sufficient. For example, n may be less than (nHP+nLP). In this case, the terminal may allocate more REs to a codeword of UCI having a high priority. In this case, according to Method 3.2-3, sufficient REs may be allocated to the codeword of the HP UCI. Since insufficient REs are allocated to the codeword of the LP UCI, the base station may request a retransmission procedure of a PUCCH from the terminal later. Alternatively, the base station may re-schedule transmission of a PUSCH.

Method 3.2-4: The terminal may determine whether a size of a PUCCH resource (e.g., n REs) is sufficient. For example, if n<(nHP+nLP), the terminal may determine that the size of the PUCCH resource is insufficient. If n (nHP+nLP), the terminal may determine that the size of the PUCCH resource is sufficient. When the size of the PUCCH resource is sufficient, the terminal may apply Method 3.2-2, and when the size of the PUCCH resource is insufficient, the terminal may apply Method 3.2-3.

If the size of the PUCCH resource is insufficient, the terminal may map the codeword of the HP UCI to the PUCCH resource, but may not be able to map the codeword of the LP UCI to the PUCCH resource. In this case, transmission of a part of the LP UCI may be dropped. For example, all or part of a specific UCI type of the LP UCI may be dropped. This operation may be distinguished from Method 3.2-4, and may be defined as Method 3.2-5 below.

Method 3.2-5: The terminal may determine whether a size of a PUCCH resource (e.g., n REs) is sufficient. For example, if n<(nHP+nLP), the terminal may determine that the size of the PUCCH resource is insufficient. If n (nHP+nLP), the terminal may determine that the size of the PUCCH resource is sufficient. When the size of the PUCCH resource is sufficient, the terminal may apply Method 3.2-2, and when the size of the PUCCH resource is insufficient, the terminal may drop all or part of a specific UCI type of the LP UCI.

Here, the droppable UCI type may be CSI. When there are a plurality of CSI reports, the terminal may select some CSI report(s) and may transmit the selected CSI report(s). When the CSI report is divided into a CSI part 1 and a CSI part 2, the terminal may select and transmit the CSI part 1, and the transmission of CSI part 1 may be utilized in calculation for limiting the number of CSI reports. That is, transmission of the CSI part 2 may be dropped.

The size (e.g., n REs) of the PUCCH resource indicated by the base station to the terminal may be adjusted to be greater than (nHP+nLP). In this case, since the number of PUCCH resources that can be configured to the terminal is limited, n unnecessarily larger than (nHP+nLP) may be set. In this case, the terminal may reduce the size of the PUCCH resource by deriving n' less than n.

Method 3.2-6: When the size of the PUCCH resource is large, the terminal may use the minimum number of PRBs greater than (nHP+nLP) by reducing the number of PRBs.

When a CSI report is transmitted on a PUCCH, in order to find the minimum number of PRBs (e.g., PRBs constituting a PUCCH resource), a calculation considering LP UCI or 'LP UCI+CRC' and the code rate may be performed. The CRC may refer to a CRC value. This operation may be directly applied to UCI having the same priority. However, when HP UCI and LP UCI are multiplexed, it may be necessary to modify the above-described operation.

Since HP UCI and LP UCI may belong to different codewords, a different CRC may be added to each of the HP UCI and the LP UCI. A different code rate may be applied to each of 'HP UCI+CRC' and 'LP UCI+CRC', and each of 'HP UCI+CRC' and 'LP UCI+CRC' may be expressed as the number of REs.

Method 3.2-7: Based on a sum of a first value that is a result of dividing the size of 'HP UCI+HP CRC' by the code rate and a second value that is a result of dividing the size of 'LP UCI+LP CRC' by the code rate, the number of REs may be derived. The derived number of REs may be converted into the number of PRBs.

For example, when the size of the HP UCI is oHP, the size of the HP CRC (e.g., CRC for the HP UCI) is oHPCRC, and the code rate is rHP, the number of REs (e.g., nHP) may be a result of (oHP+oHPCRC)/rHP. Each of oHP and oHPCRC may be a natural number. When the size of the LP UCI is oLP, the size of the LP CRC (e.g., CRC for the LP UCI) is oLPCRC, and the code rate is rLP, the number of REs (e.g., nLP) may be a result of (oLP+oLPCRC)/rLP. Each of oLP and oLPCRC may be a natural number.

Among all REs of the PUCCH resource, the number of REs other than REs to which a DM-RS is mapped may be n. n may be converted to an integer number of PRBs (or a multiple of 2, 3, or 5 PRBs).

On the other hand, the number of PRBs that the PUCCH resource has may be insufficient. In this case, the terminal may reduce the size of the UCI.

When HP UCI and LP UCI are multiplexed, the HP UCI may always be transmitted, and all of the LP UCI may be dropped. Alternatively, all or part of the LP UCI may be transmitted. Therefore, the terminal may distinguish a case where only the HP UCI is transmitted, a case where the HP UCI and a part of the LP UCI are transmitted, and a case where the HP UCI and all of the LP UCI are transmitted".

Method 3.2-6: The terminal may additionally perform a procedure for determining the size of a part of the LP UCI to be dropped.

The above-described additional procedure may correspond to a procedure for changing x bits to x' bits in the exemplary embodiments shown in FIGS. 3, 4, and/or 5

3.3: Methods of Indicating the Number of Repetitions of PUCCH

A PUCCH (e.g., UCI or multiplexed UCIs) may be repeatedly transmitted. The base station may set (or indicate) the number of repetitions of the PUCCH to the terminal by using RRC signaling, and the terminal may identify the number of repetitions of the PUCCH set by the base station. Therefore, a time resource in which the PUCCH is transmitted may be a (sub)slot in which UCI (e.g., HARQ-ACK, SR, and/or CSI) is transmitted or a first valid (sub)slot in which all symbols of the PUCCH can be transmitted considering a slot pattern. The terminal may perform the first transmission of the PUCCH in the aforementioned (sub)slot.

The number of repetitions of the PUCCH may be flexibly indicated. The terminal may transmit multiplexed UCIs (e.g., LP UCI+HP UCI) in the PUCCH resource. According to mobility of the terminal, the terminal may move quickly from an edge area of a cell to a center area of the cell. Accordingly, a quality (e.g., reception quality) of the UCI may be greatly changed.

Method 3.3-1: Configuration information of the PUCCH resource may include information on the number of repetitions of the PUCCH.

The terminal may receive scheduling DCI, and may identify the number of repetitions of a PUCCH based on a PRI included in the scheduling DCI. A PRI for a HARQ-ACK for an SPS PDSCH, semi-persistent CSI, periodic CSI, and/or SR may be configured (or indicated) to the terminal by RRC signaling.

The number of repetitions of the PUCCH may be determined for each PUCCH format, and the base station may set (or indicate) the number of repetitions of the PUCCH associated with a PUCCH format to the terminal by using RRC signaling.

According to Method 3.3-1, the number of repetitions of the PUCCH associated with the PUCCH format and/or the number of repetitions of the PUCCH associated with the PUCCH resource may be set to the terminal. The number of repetitions of the PUCCH associated with the PUCCH format may not be set, and the number of repetitions of the PUCCH associated with the PUCCH resource may be set to the terminal. The terminal may use one of the number of repetitions of the PUCCH associated with the PUCCH format and the number of repetitions of the PUCCH associated with the PUCCH resource.

Method 3.3-2: When the number of repetitions of the PUCCH associated with the PUCCH resource is set to the terminal in Method 3.3-1, the terminal may use the number of repetitions of the PUCCH associated with the PUCCH resource regardless of the number of repetitions of the PUCCH associated with the PUCCH format.

When the number of repetitions of the PUCCH is associated with the PUCCH resource in which the UCI is transmitted, the number of repetitions of the corresponding PUCCH may be applied to the UCI type indicated by the ID of the corresponding PUCCH resource. For example, the PRI included in the scheduling DCI may indicate the number of repetitions of the PUCCH. Since a PUCCH resource for transmitting another UCI type (e.g., HARQ-ACK for an SPS PDSCH, semi-persistent CSI, periodic CSI, and/or SR) is indicated by the PUCCH resource ID, the number of repetitions of the PUCCH may be applied.

Method 3.3-3: Method 3.3-1 may be applied regardless of the UCI type.

Chapter 4: PUCCH Transmit Power Determination Method 4.1: Methods for Controlling a PUCCH Transmit Power A transmit power applied to a PUCCH may be calculated based on an equation (e.g., Equation 1 below). Here, P(i, u, d, l) may be applied to a transmission occasion i of the PUCCH, u may be an index of a UL-RS used by the terminal to calculate the transmit power, d may be an index of a DL-RS used by the terminal to calculate the transmit power, and l may be an index of a set managing transmit power control (TPC) commands.

$$P(i,u,d,l)[\text{dBm}]=P_O(u)+10\cdot\log_{10}(2^\mu\cdot M_{RB}(i))+\text{PL}(d)+\Delta_F+\Delta(i)+g(i,l) \quad \text{[Equation 1]}$$

$P_O(u)$ may be a parameter that is a reference of the transmit power for the PUCCH, and a value for the u-th power control loop may be indicated by RRC signaling. $\mu$ may be a parameter for a subcarrier spacing used by a PUSCH instance, and PL(d) may be the amount of a path loss of downlink (DL) calculated based on d when a reference RS is defined as d. PL(d) may be measured (or estimated) by the terminal. g (i,l) may be an accumulated value of TPC commands for the l-th power control loop.

Here, a value of $\Delta(i)$ may be indicated by RRC signaling, and may be indicated differently according to a format of the PUCCH.

Here, a value of $\Delta(i)$ may be calculated as 0 (e.g., fixed value) or another value according to a value indicated by RRC signaling. Different equations may be applied according to the format of the PUCCH. The reason may be to adjust an offset of the transmit power so that it experiences a similar BLER due to application of a spreading code to the PUCCH or according to different coding schemes.

When the PUCCH format is 0 or 1, $\Delta(i)=\Delta_{UCI}(i)+10\cdot\log_{10}(N/N(i))$ may be defined.

When the PUCCH format is 2, 3, or 4, an exemplary embodiment in which the size of UCI is 11 bits or less and an exemplary embodiment in which the size of UCI is 12 bits or more may be classified.

If the size of UCI is 11 bits or less, $\Delta(i)=10\cdot\log_{10}(K_1\cdot(n_{HARQ-ACK}(i)+O_{SR}(i)+O_{CSI}(i))/N(i))$ may be defined. When the size of UCI is 12 bits or more, $\Delta(i)=10\cdot\log_{10}(\{2^{K_2 \cdot BPRE}-1\})$ may be defined.

Here, each of $K_1$ and $K_2$ may be a constant defined in a technical specification. A bit per resource element (BPRE) may be a parameter related to a code rate, and may be expressed as $(O_{HARQ-ACK}(i)+O_{SR}(i)+O_{CSI}(i)+O_{CRC}(i))/N(i)-O_{HARQ-ACK}(i)$ and $n_{HARQ-ACK}(i)$ may mean the size of HARQ-ACK, $O_{SR}(i)$ may mean the size of bits representing SR, and $O_{CSI}(i)$ may mean the size of CSI. $O_{CRI}(i)$ may mean the size of the CRC. $N(i)$ may mean the number of REs that the PUCCH resource has. REs to which the DM-RS is mapped may be excluded from $N(i)$.

g(i,l) may mean a value accumulating TPC commands included in DCIs for a certain time. The certain time may be defined in a technical specification.

Figure 7:
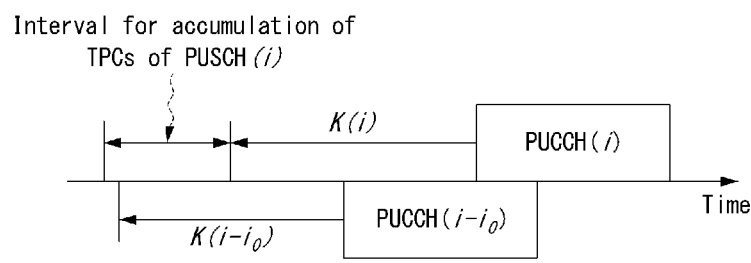
FIG. 7 is a conceptual diagram illustrating a first exemplary embodiment of a method for accumulating TPC commands applied to a PUCCH.

FIG. 7 is a conceptual diagram illustrating a first exemplary embodiment of a method for accumulating TPC commands applied to a PUCCH.

Referring to FIG. 7, a time of starting accumulation of TPC commands for a PUCCH transmission occasion i (i.e., PUCCH (i)) may be after a time of ending accumulation of TPC commands for a PUCCH transmission occasion (i−i₀) (i.e., PUCCH (i−i₀)). A time of ending the accumulation of TPC commands for the PUCCH transmission occasion i may mean the last symbol of a CORESET to which the last DCI among DCIs allocating UCI to the PUCCH transmission occasion i belongs. Here, i₀ may mean a minimum natural number that makes a time period for performing the accumulation of TPC commands greater than 0. The accumulation of TPC commands may only be applied to the same 1.

When the terminal transmits a PUCCH by multiplexing UCIs having the same priority, Equation 1 may be applied. When UCIs having different priorities are multiplexed, an appropriate power of the PUCCH may not be expressed by Equation 1.

Method 4.1-1: When a PUCCH resource in which HP UCI and LP UCI are multiplexed is indicated by LP DCI, a transmit power of the PUCCH may be determined only by the size of the LP UCI. Alternatively, when the PUCCH resource is indicated by HP DCI, the transmit power of the PUCCH may be determined only by the size of the HP UCI.

Method 4.1-1 may mean that the transmit power of the PUCCH is determined when DCI indicating the PUCCH resource is received. When the terminal receives HP DCI after receiving LP DCI, and LP UCI and HP UCI are multiplexed, a transmit power of a PUCCH indicated by the LP DCI may not be sufficient. This is because the size of the additional HP UCI is not taken into account. To solve this problem, TPC commands may be further accumulated.

Method 4.1-2: In order to determine the transmit power of the PUCCH in Method 4.1-1, DCIs to which the accumulation of TPC commands is applied may include at least all DCIs that cause UCI transmission in the PUCCH.

Here, the DCI may include LP DCI and/or HP DCI for scheduling UCI transmission. Also, the DCI may be TPC DCI (e.g., DCI format 2_2). In this case, even when 1 managing TPC commands has different values, TPC commands may be accumulated according to Method 4.1-2.

Method 4.1-3: When the TPC commands for different set indexes (1) are accumulated in Method 4.1-2, the accumulated value of the corresponding TPC commands may not be reflected to a later PUCCH transmission occasion (e.g., PUCCH transmission occasion (i+1), PUCCH transmission occasion (i+2), etc.).

DCI indicating the PUCCH transmission occasion i may assume a specific 1. In the multiplexing procedure of HP UCI and LP UCI, the transmit power of the PUCCH may be appropriately corrected. In the PUCCH transmission occasion (i+1), multiplexing of HP UCI and LP UCI may not be performed. In this case, the terminal may reflect the accumulated value of TPC commands only for the same 1. Therefore, the terminal may re-correct the accumulated values of TPC commands for a different 1, and may regard the corrected value as a value before the accumulation.

Since only the size of the HP UCI or the LP UCI is considered in the proposed method (e.g., Method 4.1-1), in order to correct the accumulated value, it may be preferable that TPC commands for different 1 are also accumulated. Alternatively, both the size of the HP UCI and the size of the LP UCI may be considered. In this case, the transmit power of the PUCCH may be sufficient even by accumulating TPC commands for the same 1.

Method 4.1-4: In consideration of the size of UCIs having different priorities, the transmit power of the PUCCH in which HP UCI and LP UCI are multiplexed may be corrected.

When LP UCI and HP UCI are multiplexed and the existing PUCCH resource set is used, an equation for deriving the transmit power of the PUCCH may be different according to the size of the UCI.

When LP UCI and HP UCI are multiplexed and the PUCCH resource is defined within one PUCCH resource set, it may be assumed that the size of UCI is always larger than a threshold. For example, when calculating $\Delta(i)$, the terminal may assume that the size of the LP UCI is 12 bits or more.

According to a PUCCH format in which the LP UCI and the HP UCI are multiplexed, the terminal may add $\Delta'(i)$ to the transmit power of the PUCCH. For the PUCCH indicated by the LP DCI, $\Delta'(i)$ may be derived from the size of the HP UCI. For the PUCCH format indicated by the LP DCI, $\Delta'(i)=10\cdot\log_{10}(K_1\cdot(n_{HARQ-ACK}(i)+O_{SR}(i)+O_{CSI}(i))/N(i))$ or $\Delta'(i)=10\cdot\log_{10}(\{2^{K_2 \cdot BPRE}-1\})$ may be defined.

For the PUCCH indicated by the HP DCI, $\Delta'(i)$ may be derived from the size of the LP UCI. For the PUCCH format indicated by the HP DCI, $\Delta'(i)=10\cdot\log_{10}(K_1\cdot(n_{HARQ-ACK}(i)+O_{SR}(i)+O_{CSI}(i))/N(i))$ or $\Delta'(i)=10\cdot\log_{10}(\{2^{K_2 \cdot BPRE}-1\})$ may be defined. BPRE may mean $(O_{HARQ-ACK}(i)+O_{SR}(i)+O_{CSI}(i)+O_{CRC}(i))/N(i)$. Here, values of $K_1$ and $K_2$ for the LP UCI may be different from values of $K_1$ and $K_2$ for the HP UCI.

According to another method, the LP UCI and the HP UCI may not be distinguished from each other, and the size of the UCI may be the sum of the size of the LP UCI and the size of the HP UCI. A separate $\Delta'(i)$ may not be introduced, and $\Delta(i)$ may be defined differently. For example, $\Delta(i)=10\cdot\log_{10}(K_1\cdot(n_{LP\ UCI}+n_{HP\ UCI})/N(i))$ or $\Delta(i)=10\cdot\log_{10}(\{2^{K_2 \cdot BPRE}-1\})$ may be defined. Here, the size of the LP UCI may be defined as $n_{LP\ UCI}=n_{HARQ-ACK}(i)+O_{SR}(i)+O_{CSI}(i)$, and the size of the HP UCI may be defined as $n_{HP\ UCI}=n_{HARQ-ACK}(i)+O_{SR}(i)$. BPRE may be $(n_{LP\ UCI}+n_{HP\ UCI})/N(i)$. For the calculation of the BPRE, the sum of the size of the LP UCI and the size of the HP UCI may be used.

In addition, the size of UCI having a size of 11 bits or less may be calculated using a separate equation, and the transmit power of the PUCCH may be calculated based on the calculation result.

Chapter 5: Method for Allocating Two or More TBs by Using One DCI

The base station may allocate two or more TBs to the terminal. In order to save a power of the terminal, the base station may indicate (or configure) a search space having a long periodicity to the terminal. In this case, traffic of the terminal may occur more frequently than the periodicity of the search space. In this case, transmission of two or more TBs may be indicated to the terminal by one DCI, one configured grant (CG), or one semi-persistent scheduling (SPS).

5.1: PDSCH Allocation Method

The base station may configure a time domain resource assignment (TDRA) table to the terminal by using RRC signaling, and may transmit DCI including information of one index (e.g., one TDRA index) within the TDRA table to the terminal. One index within the TDRA table may indicate a time resource of a PDSCH. Each of indexes belonging to the TDRA table may indicate a PDSCH mapping type, $K_0$, and/or a start and length indicator (SLIV). The PDSCH mapping type may be classified into a mapping type A and a mapping type B. The PDSCH mapping type may be used to determine a location of PDSCH DM-RS and a scheme in which coded data is mapped. $K_0$ may mean a slot offset between a slot in which scheduling DCI is received and the first slot in which the PDSCH is received. The SLIV may be an index derived by the first symbol belonging to the PDSCH and the number of symbols belonging to the PDSCH.

Each of the indexes belonging to the TDRA table (e.g., TDRA indexes) may additionally indicate the number of repetitions of the PDSCH. Alternatively, the TDRA index may not indicate the number of repetitions of the PDSCH, and the base station may indicate (or set) the number of repetitions of the PDSCH to the terminal by using separate RRC signaling. In this case, the terminal may regard that a reception resource (e.g., time resource) of the PDSCH is repeated on a slot, subslot, or minislot basis, and the number of repetitions of the PDSCH is indicated (or, set) by a TDRA index or RRC signaling.

In a procedure of repeatedly receiving the PDSCH, the terminal may assume that TBs having different redundancy versions (RVs) are received. For example, an RV indicated by the scheduling DCI may correspond to an RV applied to an initial PDSCH received by the terminal, and RV(s) applied to PDSCH(s) received by the terminal later may be determined according to the initial RV and a certain order (e.g., RV pattern). The TDRA table may be configured as shown in Table 1 below. The number of repetitions of the PDSCH may be additionally indicated by the TDRA index. Alternatively, the number of repetitions of the PDSCH may not be indicated by the TDRA index.

TABLE 1

| | TDRA table |
|---|---|
| 0 | $K_0$, PDSCH mapping type, SLIV, (number of repetitions of PDSCH) |
| 1 | $K_0$, PDSCH mapping type, SLIV, (number of repetitions of PDSCH) |
| 2 | $K_0$, PDSCH mapping type, SLIV, (number of repetitions of PDSCH) |
| 3 | $K_0$, PDSCH mapping type, SLIV, (number of repetitions of PDSCH) |

In Table 1, the TDRA table may include four TDRA indexes. The terminal may determine the time resource of the PDSCH by using information indicated by one TDRA index. In the proposed method, in order to allocate a plurality of TBs to the terminal, the fields of the scheduling DCI may be extended.

Method 5.1-1: The TDRA index may be extended, and the TDRA index may indicate two or more SLIVs.

Method 5.1-2: In Method 5.1-1, each of the SLIVs indicated by the TDRA index may be interpreted as a time resource to which one TB is mapped, and one SLIV may correspond to each slot or mini-slot. For example, when the TDRA index indicates K SLIVs, the PDSCH may be received in K slots. That is, the terminal may receive K TBs. K may be a natural number.

Since TBs are managed differently, [NDI, RV, HPN] for each of the TBs may be independently included in the scheduling DCI. To support this operation, the fields of DCI may be extended, and K NDIs and K RVs may be included in the DCI.

DCI (e.g., fields of DCI) may be extended to include K [NDI, RV]. When a HARQ process number (HPN) for one TB is indicated, a HPN for each of the remaining TBs (e.g., (K−1) TBs) may be determined as a value increased by 1 from the indicated HPN. For example, if DCI indicates a HPN #x, a HPN for the i-th TB (i=0, 1, 2, . . . , K−1) may be interpreted as (x+i) % N. Here, N may mean the number of HARQ process identifiers (HPIDs) that the terminal can use in the serving cell.

5.1.1: PUCCH Transmission Method

Scheduling DCI may indicate one HARQ-ACK timing and one PUCCH resource. The terminal may consider that HARQ-ACK bits for K TBs are multiplexed in one HARQ codebook.

For transmission of a type 1 HARQ codebook, the terminal may consider that one HARQ-ACK bit is generated for a TB corresponding to an SLIV according to a TDRA index on a one-to-one basis. K HARQ-ACK bits may be derived for K TDRA indexes. One HARQ-ACK bit may correspond to a PDSCH candidate on a one-to-one basis.

When one TDRA index indicates K SLIVs, it may be preferable to minimize modification of the generation procedure of the type 1 HARQ codebook.

In the procedure of generating the type 1 HARQ codebook, a PDSCH belonging to the TDRA table may be considered only once as a loop for the TDRA index, and then the corresponding PDSCH may be omitted from the TDRA table. In addition, it may be assumed that the TDRA index corresponds to one TB.

Method 5.1-3: In order to express TDRA indexes corresponding to K TBs, a TDRA index corresponding to one TB may indicate an SLIV or '$K_0$ and SLIV', and information indicated by the TDRA index may not be considered in the size of the type 1 HARQ codebook.

Method 5.1-4: In Method 5.1-3, TDRA index(s) corresponding to K TBs may be expressed as a union of TDRA indexes each of which corresponds to one TB.

According to the above-described exemplary embodiment, the TDRA table may be configured as shown in Table 2 below.

TABLE 2

| | TDRA table |
|---|---|
| 0 | $K_0$, PDSCH mapping type, SLIV, (number of repetitions of PDSCH) |
| 1 | $K_0$, PDSCH mapping type, SLIV, (number of repetitions of PDSCH) |
| 2 | $K_0$, PDSCH mapping type, SLIV, (number of repetitions of PDSCH) |
| 3 | $K_0$, PDSCH mapping type, SLIV, (number of repetitions of PDSCH) |

TABLE 2-continued

TDRA table

| | |
|---|---|
| 4 | $K_0$, (PDSCH mapping type, SLIV), (PDSCH mapping type, SLIV), . . . |
| 5 | $K_0$, (PDSCH mapping type, SLIV), (PDSCH mapping type, SLIV), . . . |

In Table 2, TDRA indexes #0 to #3 may be the existing TDRA list, and the TDRA table may further include additional TDRA indexes #4 and #5. The extended TDRA list may include the TDRA indexes #0 to #5. Each of the TDRA indexes #4 and #5 may indicate $K_0$ and one or more (PDSCH mapping type, SLIV). The TDRA index belonging to the extended TDRA list may indicate $K_0$ and one or more SLIVs.

The TDRA index may be classified into two types. One TDRA index corresponding to a TDRA index type 1 may correspond to one TB. The TDRA index type 1 may be the type of the TDRA index belonging to the existing TDRA list. One TDRA index corresponding to a TDRA index type 2 may correspond to K TBs. The TDRA index type 2 may be the type of the TDRA index (e.g., additional TDRA index) belonging to the extended TDRA list. One TDRA list (e.g., one TDRA sub-table) may be configured only with TDRA indexes each corresponding to one TB, and additionally considered TDRA indexes may indicate only time resources related to the TDRA sub-table. In Table 2, a TDRA table (or, TDRA sub-table) including a TDRA sub-table consisting of four TDRA indexes (e.g., TDRA indexes #0 to #3) and two additional TDRA indexes (e.g., TDRA indexes #4 and #5) may be configured. The size of the type 1 HARQ codebook may be determined in consideration of only the TDRA sub-table.

Each of the TDRA indexes #4 and #5 may indicate 'one or more SLIVs' or '$K_0$ and one or more SLIVs'. The TDRA indexes #4 and #5 may not be considered to determine the size of the type 1 HARQ codebook. According to Method 5.1-4, the TDRA index #4 may be assumed to have SLIV(s) indicated by TDRA indexes #i and #j, and the TDRA index #5 may be assumed to have SLIV(s) indicated by TDRA indexes #k and #l. In this case, each of TDRA indexes #4 and #5 may indicate two TBs. Here, each of i, j, k, and l may be an integer equal to or greater than 0.

In a step of placing HARQ-ACK bits in the type 1 HARQ codebook, K HARQ-ACK bits corresponding to K PDSCHs according to the additional TDRA index may be placed. Here, the PDSCH candidates according to the additional TDRA index may correspond to the TDRA index(es) belonging to the TDRA sub-table.

When the TDRA index #4 in the TDRA table defined in Table 2 is indicated to the terminal and the TDRA index #4 indicates two SLIVs, the terminal may generate two HARQ-ACK bits for two received PDSCHs, and the two HARQ-ACK bits may be placed at positions corresponding to the TDRA indexes #i and #j in the type 1 HARQ codebook. When the TDRA index #5 in the TDRA table defined in Table 2 is indicated to the terminal and the TDRA index #5 indicates two SLIVs, the terminal may generate two HARQ-ACK bits for two received PDSCHs, and the two HARQ-ACK bits may be placed at positions corresponding to the TDRA indexes #k and #l in the type 1 HARQ codebook.

Method 5.1-5: In Method 5.1-3, the positions where the HARQ-ACK bits for the additional TDRA index are placed in the type 1 HARQ codebook may be positions of PDSCH candidates corresponding to the TDRA indexes belonging to the TDRA sub-table referenced by the additional TDRA index.

According to Method 5.1-5, when resources of a plurality of TBs are indicated by one TDRA index, HARQ-ACK bits corresponding to the plurality of TBs may not be consecutively arranged in the type 1 HARQ codebook. That is, the HARQ-ACK bits corresponding to the plurality of TBs may be disposed at positions corresponding to slots in which the plurality of TBs are received in the type 1 HARQ codebook.

The size of the type 1 HARQ codebook may be determined by the number of PDSCH candidates. Therefore, in order to determine the size of the type 1 HARQ codebook, a HARQ-ACK timing may be considered together with the number of PDSCH candidates. If there is no restriction, in a slot or subslot in which the PUCCH is transmitted, the number of valid PDSCH candidates may be greatly increased. Therefore, Method 5.1-6 below may be considered.

Method 5.1-6: When a HARQ-ACK timing (e.g., $K_1$ offset) applicable to the terminal in Method 5.1-3 may be a part of $K_1$ offset applied to a case where transmission of K TBs is indicated (e.g., a case where transmission of one TB is indicated).

The above-described methods may be methods for indicating transmission of two or more TBs while maintaining the size of the type 1 HARQ codebook. To support this operation, the TDRA index may be limitedly extended. Alternatively, the application of $K_1$ offset may be limited.

For example, a relationship between $K_1$ offsets applied when allocating a resource of one TB and $K_1$ offsets applied when allocating resources of K TBs may be interpreted as an inclusion relationship. For the (sub)slot n in which the PUCCH is transmitted, a (sub)slot to which the PDSCH candidate belongs may be a (sub)slot (n−$K_1$(i)). Here, i may be defined as 'i=0, 1, 2, . . . '. {$K_1$(0), $K_1$(1), $K_1$(2), $K_1$(3), . . . } may mean $K_1$ offsets.

Figure 8A:
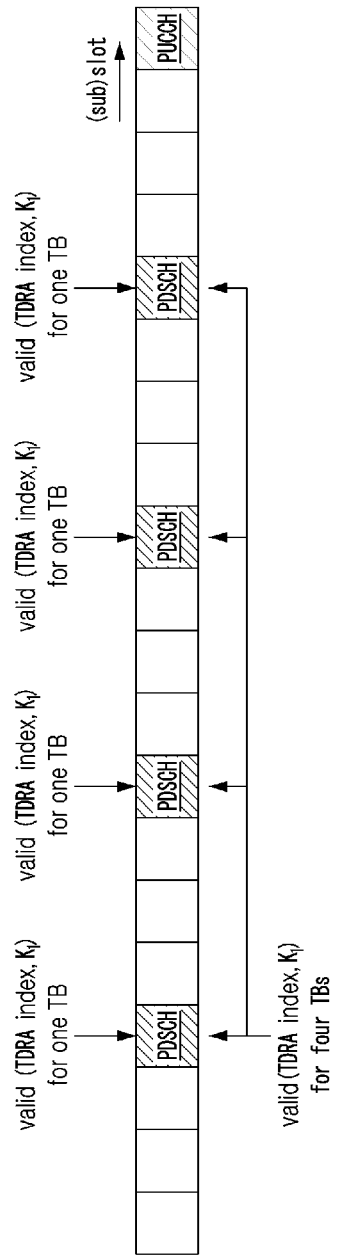
FIG. 8A is a conceptual diagram illustrating a first exemplary embodiment of a HARQ-ACK timing applied to a type 1 HARQ codebook.

FIG. 8A is a conceptual diagram illustrating a first exemplary embodiment of a HARQ-ACK timing applied to a type 1 HARQ codebook.

Referring to FIG. 8A, $K_1$ may be set to (or indicated as) a value among {4, 8, 12, 16}. When a transmission resource of one TB is allocated, the number of (sub)slots in which a PDSCH is received may be 4. When an additional TDRA index for allocating transmission resources of two TBs is considered, a (sub)slot in which each PDSCH is received may be determined from {4, 8, 12, 16}. Therefore, in a procedure of receiving two TBs, the two TBs may be received with an interval of four (sub)slots. According to a proposed method, the number of TDRA indexes for allocating transmission resources of four TBs may be 1, and in this case, $K_1$ may be set to (or indicated as) 4.

When TBs are received in two consecutive (sub)slots, the value of $K_1$ may be extended. Since a calculation unit of $K_1$ is the last (sub)slot in which the PDSCH is received, when {4, 8, 12, 16} is reused, the (sub)slot in which the PDSCH can be received may be interpreted as {4, 5, 7, 8, 11, 12, 15, 16}. Accordingly, the size of the type 1 HARQ codebook may be greatly increased, and the TDRA index may be preferably expressed as a combination of TDRA indexes each of which allocates a transmission resource of one TB. That is, in the exemplary embodiment shown in FIG. 8A, in order to allocate transmission resources of two TBs, $K_1$ may be considered as {4, 8, 12}, and the terminal may receive two TBs with an interval of 4 (sub)slots.

Figure 8B:
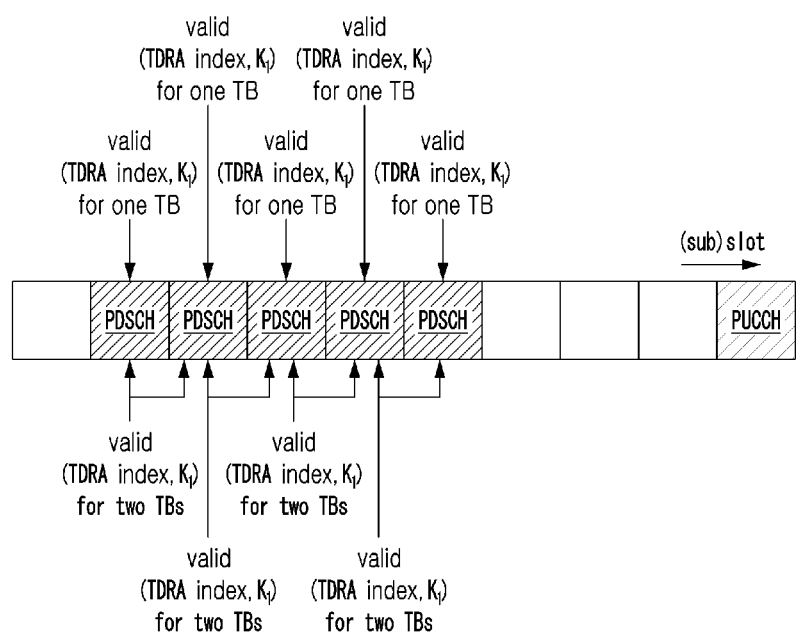
FIG. 8B is a conceptual diagram illustrating a second exemplary embodiment of a HARQ-ACK timing applied to a type 1 HARQ codebook.

FIG. 8B is a conceptual diagram illustrating a second exemplary embodiment of a HARQ-ACK timing applied to a type 1 HARQ codebook.

Referring to FIG. 8B, $K_1$ may be set to (or indicated as) a value among {4, 5, 6, 7, 8}, and one TB may be allocated. In this case, when the size of the type 1 HARQ codebook is to be maintained while allocating transmission resources of two TBs, the number of TDRA indexes for allocating the transmission resources of the two TBs may be four. $K_1$ may be set to a value within {4, 5, 6, 7}.

Since the number of TBs indicated to the terminal is dynamically changed when a type 2 HARQ codebook is supported, the terminal may assume the size of the type 2 HARQ codebook in consideration of discontinuous transmission (DTX). Since the size of the type 2 HARQ codebook is dynamically changed in a procedure of generating the type 2 HARQ codebook, scheduling DCI may include a C-DAI and/or T-DAI. Since the DAI corresponds to the number of DCIs, when a transmission resource of one TB is allocated, the number of DCIs may be interpreted as the size of the type 2 HARQ codebook. When MIMO is configured and the maximum number of codewords is two, DCI may allocate two TBs. In this case, the size of the type 2 HARQ codebook may be two bits, and twice the number of DCIs may be interpreted as the size of the type 2 HARQ codebook.

Method 5.1-7: The base station may configure (or indicate) DCI for allocating transmission resources of a plurality of TBs to the terminal. In this case, the type 2 HARQ codebook cannot be configured, and it may be configured by RRC signaling that only the type 1 HARQ codebook is supported.

Since the number of TBs indicated to the terminal is dynamically changed when the type 2 HARQ codebook is supported, the terminal may assume the size of the type 2 HARQ codebook in consideration of DTX.

Method 5.1-8: The TDRA index may be extended, and thus K HARQ-ACK bits may be generated. In this case, the number of DCIs is counted by the DAI, but K HARQ-ACK bits may be derived for one DCI.

The terminal may record HARQ-ACK(s) for actually-scheduled TB(s) in the HARQ codebook in the order of SLIVs, and may record NACK in other locations in the HARQ codebook. For example, when K=8 and two TBs are received, the first two bits within the HARQ codebook may be set to reception results the two TBs (e.g., HARQ-ACKs) and, the remaining six bits may be set to NACK.

When the bit(s) indicating NACK is always set, the size of the type 2 HARQ codebook may be increased by K times, and many bits in the type 2 HARQ codebook may be set to NACK. In order to solve this problem, since the TDRA index indicates transmission resources of K or less TBs, it may be preferable that the terminal knows the number of TBs actually indicated by the base station. The above-mentioned problem may be solved by extending the size of the DAI field included in DCI.

5.2: PUSCH Allocation Method

The base station may configure (or indicate) a TDRA table to the terminal by using RRC signaling, and may transmit DCI including information of one TDRA index within the TDRA table to the terminal. A time resource of a PUSCH may be indicated by a TDRA index belonging to the TDRA table. The TDRA index may indicate a PUSCH mapping type, $K_2$, and/or SLIV. The PUSCH mapping type may be classified into a mapping type A and a mapping type B. The PUSCH mapping type may be used to determine a location of a PUSCH DM-RS and a scheme in which coded data is mapped. $K_2$ may refer to a slot offset between a slot in which scheduling DCI is received and the first slot in which the PUSCH is transmitted. The SLIV may be an index derived by the first symbol belonging to the PUSCH and the number of symbols belonging to the PUSCH.

One information (e.g., TDRA index) belonging to the TDRA table may additionally indicate the number of repetitions of the PUSCH (e.g., the number of receptions of the PUSCH). Alternatively, the TDRA index may not indicate the number of repetitions of the PUSCH. In this case, the base station may inform the terminal of the number of repetitions of the PUSCH by using RRC signaling, and the terminal may identify the number of repetitions of the PUSCH indicated by the base station. The terminal may regard that a time resource in which the PUSCH is transmitted is repeated on a slot basis, and the number of repetitions of the PUSCH is indicated by the TDRA index or RRC signaling.

In a procedure of repeatedly transmitting the PUSCH (e.g., TB), the terminal may transmit TBs having different RVs. For example, an RV indicated by the scheduling DCI may be an RV applied to the first PUSCH transmitted by the terminal, and RV(s) applied to PUSCH(s) after the first PUSCH may be determined by the RV indicated by the scheduling DCI and a certain order. The certain order may be defined in a technical specification.

Scheduling DCI may schedule transmissions of two or more TBs. In a communication system operating in an unlicensed band, the terminal may derive information on a plurality of time resources (e.g., a plurality of PUSCHs) based on a TDRA index indicated by the DCI format 0_1. For example, the terminal may independently derive a PUSCH mapping type and an SLIV of each of the plurality of PUSCHs. However, in order to operate in an unlicensed band, PUSCHs according to SLIVs indicated to the terminal may be contiguous in the time domain. All SLIVs may be defined based on the same symbol. For example, the reference symbol for interpretation of the SLIV may be the first symbol of the slot or the next symbol of a CORESET including the scheduling DCI.

Since valid values of SLIV mean that a PUSCH is limited to be scheduled within one slot, when transmission resources of two or more TBs are allocated in an unlicensed band, the PUSCH may be continuously transmitted in up to 14 symbols.

FIG. 9 is a conceptual diagram illustrating a first exemplary embodiment of a method for configuring PUSCHs according to SLIVs indicated by a TDRA index.

Referring to FIG. 9, one TDRA index may indicate a PUSCH mapping type and/or SLIV of each of four TBs. That is, one TDRA index may indicate four SLIVs (e.g., first SLIV, second SLIV, third SLIV, and fourth SLIV). The terminal may derive the first symbol to which each TB (e.g., each PUSCH) is mapped by interpreting the four SLIVs based on the same reference symbol. '$S_{i+1}=S_i+L_i$, i=1,2,3' may be defined, and $K_2$ may be commonly indicated by the TDRA index.

A time resource for transmission of the first TB may be indicated by the first SLIV (e.g., $S_1$, $L_1$), a time resource for transmission of the second TB may be indicated by the second SLIV (e.g., $S_2$, $L_2$), a time resource for transmission of the third TB may be indicated by the third SLIV (e.g., $S_3$, $L_3$), and a time resource for transmission of the fourth TB may be indicated by the fourth SLIV (e.g., $S_4$, $L_4$).

In order to freely allocate transmission resources of the TBs, transmissions of two or more TBs may be scheduled not only by scheduling DCI but also by a configured grant (CG). In a communication system operating in a licensed band, PUSCH resources may not need to be contiguously arranged in the time domain. Therefore, the transmission resource of the TB may be scheduled freely. A plurality of SLIVs indicated by one TDRA index may indicate discontiguous time resources in the time domain.

Method 5.2-1: Time resources derived from SLIVs indicated by a TDRA index may not necessarily be contiguous.

A method in which a TDRA index indicates a plurality of SLIVs may be subdivided. As the first method, a TDRA index indicating a plurality of SLIVs may be a combination of TDRA indexes each of which indicates one SLIV. As the second method, an interpretation method of the SLIV indicated by the TDRA index may be different.

Method 5.2-2: In Method 5.2-1, the terminal may derive K SLIVs from a TDRA index.

In order to freely allocate resources of K TBs, a PUSCH mapping type and/or SLIV for each of the K TBs may be independently indicated (or set). K may be a natural number. Each of the K TDRA indexes may indicate a time resource of one TB, and a combination of the K TDRA indexes may be interpreted as one TDRA index for allocating time resources of the K TBs. To support this operation, the base station may transmit K TDRA indexes to the terminal. Slot offsets for PUSCH transmissions may be set to a common value.

For example, the TDRA list may consist of only TDRA indexes each allocating a time resource of one TB, and a combination of the TDRA indexes may be interpreted as a TDRA index allocating time resources of K TBs.

According to the above-described exemplary embodiment, the TDRA table may be configured as shown in Table 3 below.

TABLE 3

TDRA table

| | |
|---|---|
| 0 | $K_2$, PUSCH mapping type, SLIV, (number of repetitions of PUSCH) |
| 1 | $K_2$, PUSCH mapping type, SLIV, (number of repetitions of PUSCH) |
| 2 | $K_2$, PUSCH mapping type, SLIV, (number of repetitions of PUSCH) |
| 3 | $K_2$, PUSCH mapping type, SLIV, (number of repetitions of PUSCH) |
| 4 | $K_2$, (PUSCH mapping type, SLIV), (PUSCH mapping type, SLIV), . . . |
| 5 | $K_2$, (PUSCH mapping type, SLIV), (PUSCH mapping type, SLIV), . . . |

In Table 3, the TDRA indexes #0 to #3 may be the existing TDRA list, and the TDRA table may further include additional TDRA indexes #4 and #5. The extended TDRA list may include the TDRA indexes #0 to #5. Each of the TDRA indexes #4 and #5 may indicate $K_2$ and one or more (PUSCH mapping type, SLIV). Alternatively, the TDRA index belonging to the extended TDRA list may indicate $K_2$ and one or more SLIVs.

The TDRA index may be classified into two types. One TDRA index corresponding to a TDRA index type 1 may correspond to one TB. The TDRA index type 1 may be a type of a TDRA index belonging to the existing TDRA list. One TDRA index corresponding to a TDRA index type 2 may correspond to K TBs.

One TDRA list (e.g., one TDRA sub-table) may be configured only with TDRA indexes each corresponding to one TB, and additionally considered TDRA indexes may indicate only time resources related to the TDRA sub-table.

In Table 3, a TDRA sub-table consisting of four TDRA indexes (e.g., TDRA indexes #0 to #3) and a TDRA table (e.g., TDRA sub-table) including two additional TDRA indexes (e.g., TDRA indexes #4 and #5) may be configured. Each of the TDRA indexes #4 and #5 may be used to allocate time resources of two TBs.

Method 5.2-3: In Method 5.2-1, the terminal may sequentially interpret SLIVs indicated by a TDRA index. The terminal may interpret an SLIV for the (i+1)-th TB based on interpretation of an SLIV for the i-th TB.

The value of $K_2$ may be shared, and the interpretation of each of the SLIVs may be different. S derived from the SLIV may mean a symbol offset, and L derived from the SLIV may mean the length of a PUSCH instance. For example, the terminal may derive $S_i$ and $L_i$ from the i-th SLIV. In this case, the terminal may interpret a result of calculation based on $(S_i, L_i)$ as a position $(T_{i+1})$ of the first symbol to which the TB corresponding to the (i+1)-th SLIV is mapped. $(T_i+L_i)$ may belong to one slot.

Figure 10:
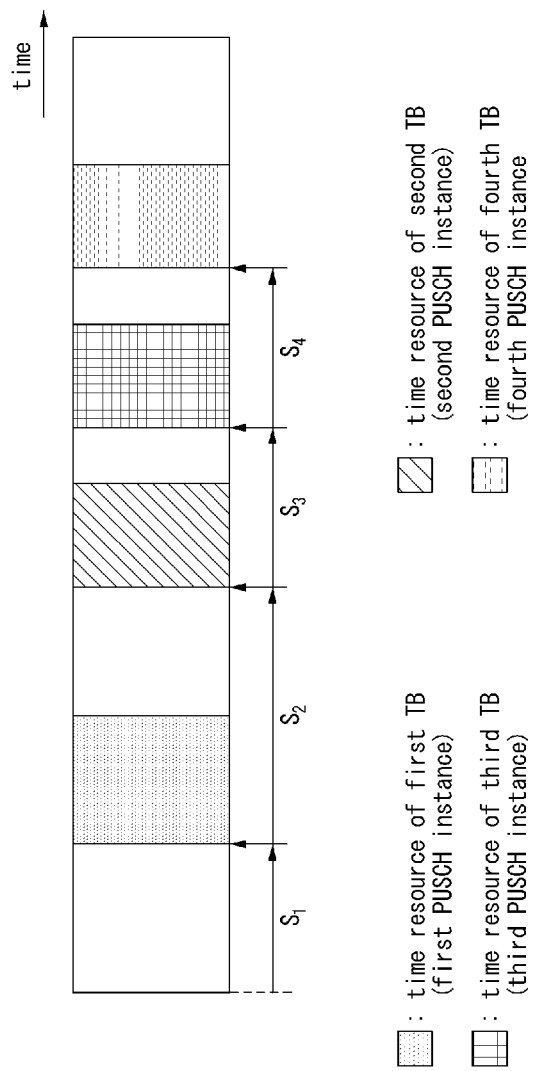
FIG. 10 is a conceptual diagram illustrating a first exemplary embodiment of a method for interpreting a PUSCH instance based on a TDRA index

FIG. 10 is a conceptual diagram illustrating a first exemplary embodiment of a method for interpreting a PUSCH instance based on a TDRA index.

Referring to FIG. 10, one TDRA index may indicate four SLIVs. The terminal may derive four PUSCH instances from four SLIVs indicated by the TDRA index. One PUSCH instance may mean transmission of one TB. For example, the terminal may calculate $T_i$ based on Equation 2 below, and may derive four PUSCH instances based on $T_i$.

$$T_i = \sum_{b=1}^{i} S_b, \, S_b \geq L_b, \, S_0 = 0 \qquad \text{[Equation 2]}$$

Figure 11:
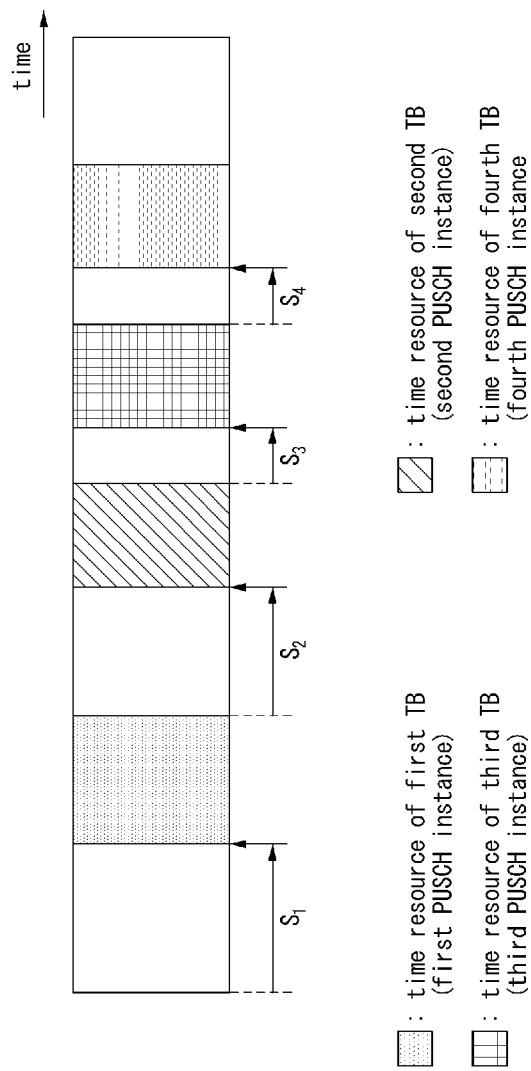
FIG. 11 is a conceptual diagram illustrating a second exemplary embodiment of a method for interpreting a PUSCH instance based on a TDRA index.

FIG. 11 is a conceptual diagram illustrating a second exemplary embodiment of a method for interpreting a PUSCH instance based on a TDRA index.

Referring to FIG. 11, one TDRA index may indicate four SLIVs. The terminal may derive four PUSCH instances from four SLIVs indicated by the TDRA index. For example, the terminal may calculate $T_i$ based on Equation 3 below, and may derive four PUSCH instances based on $T_i$.

$$T_i = S_i + \sum_{b=1}^{i-1} (S_b + L_b) \qquad \text{[Equation 3]}$$

The TBs may be managed differently. Accordingly, an NDI, RV, and/or HPN for each of the TBs may be set independently, and scheduling DCI may include NDI, RV, and/or HPN for each of the TBs. DCI (e.g., fields of the DCI) may be extended to include K NDIs and K RVs. When the HPN for one TB is indicated by the DCI, the HPN of each of the remaining TBs (e.g., (K−1) TBs) may be a value increased by 1 from the HPN indicated by the DCI. For example, when DCI indicates a HPN #x, the HPN of the i-th TB may be (x+i) % N. i may be defined as 'i=0, 1, 2, . . . , K−1', and N may indicate the number of HPIDs usable in the serving cell.

5.3: Methods of Interpreting DCI (e.g., Fields of the DCI) in a Retransmission Procedure One DCI may schedule transmission of a plurality of TBs. In this case, the number of TBs scheduled by the DCI may be dynamically changed. The base station may transmit information on the maximum number of schedulable TBs to the terminal by using RRC signaling, and the terminal may identify the maximum number of schedulable TBs indicated (or set) by the base station. Alternatively, the terminal may identify the maximum number of TBs schedulable to the terminal based on the TDRA index(s) indicated by the DCI. That is, the maximum number of schedulable TBs may be implicitly indicated by the DCI.

When the TDRA index may indicate transmission resources of K or less TBs, the scheduling DCI may include scheduling information of L TBs. L may be less than or equal to K. The HPN of the first TB among the L TBs may be x indicated by the scheduling DCI, and the HPNs of the remaining TBs (e.g., (L−1) TBs) may be x+1, . . . , and x+L−1.

In the PDSCH transmission procedure, one or more TBs among the TBs received by the terminal may be retransmission TB(s). When the number of TBs scheduled by the DCI is L, consecutive L HPNs may not be able to indicate initial transmission and/or retransmission. The above-described operation may be equally applied to a PUSCH transmission procedure.

In the exemplary embodiments below, K TBs may be all initial transmission TBs, and L TBs may be retransmitted after transmission of the initial transmission TBs. The HPNs of the K TBs may be x, x+1, . . . , and x+K−1. Retransmission for all the L TBs may not be scheduled by the DCI.

Method 5.3-1: When transmissions of two or more TBs are scheduled by one DCI, all of the two or more TBs may be considered as initial transmission TBs.

Initial transmission and retransmission may be classified by DCI. For example, DCI for initial transmission may be distinguished from DCI for retransmission. Therefore, according to Method 5.3-1, the terminal may not need to identify an NDI. In this case, the DCI may not include information indicating the NDI.

Method 5.3-2: In Method 5.3-1, DCI may not include an NDI field.

According to Method 5.3-2, even when an NDI is not indicted by DCI, the terminal may determine that the retransmission operation is not scheduled based on the DCI (e.g., a specific DCI format). When all K TBs are retransmitted or when L TBs are retransmitted, the corresponding transmissions may have consecutive HPNs. In this case, information indicating that all TBs scheduled by the DCI are initial transmission TBs or retransmission TBs may be included in the DCI.

Method 5.3-3: In Method 5.3-1, the size of the NDI field included in the DCI may be1 bit.

It may be difficult to retransmit all TBs with contiguous HPNs. Accordingly, the base station may use L DCIs to retransmit L TBs, and each of the L DCIs may schedule retransmission of one TB.

For example, DCI scheduling PDSCH(s) for transmission of four TBs or less may be considered. The DCI may indicate a common HPN for the TBs, and a TDRA index for deriving time resources of the respective TBs may be included in the corresponding DCI. In order to commonly indicate an NDI, according to Method 5.3-3, one NDI included in the DCI may be applied to all TBs.

On the other hand, when the common NDI is applied to all TBs, a degree of freedom of scheduling may be reduced. Even if the payload size of DCI increases, as many NDI fields as the maximum number of TBs indicated by the TDRA table may be used. The reason is that the DCI size is indicated by RRC signaling in consideration of limitation of processing capability of the terminal. The terminal may derive the number of TBs based on the TDRA index, and may assume that the derived TBs correspond to the NDI in order.

Even in this case, in order to indicate non-consecutive HPNs, the DCI may include an additional field.

Method 5.3-4: DCI may include information indicating a reception pattern of TB(s).

Method 5.3-5: In Method 5.3-4, the information indicating the reception pattern of TB(s) may be configured as a bitmap, and the length of the bitmap may correspond to the maximum number of schedulable TBs.

According to Method 5.3-4, the DCI may additionally include a bitmap indicating a TB reception pattern (hereinafter, referred to as 'TB transmission indicator (TBTI)'). The TBTI may indicate TB(s) that the terminal receives or TB(s) that the terminal transmits. The length of the TBTI may be the maximum number of TBs that can be scheduled by the TDRA table. A bit set to a first value (e.g., 1) in the TBTI may indicate that a corresponding TB is transmitted, and a bit set to a second value (e.g., 0) may indicate that a corresponding TB is not transmitted.

When DCI additionally includes a TBTI, the terminal may generate various combinations of HPNs by using the TBTI included in the DCI. This operation may be performed even when the HPNs are not consecutive. When the HPN is a natural number between 0 and 15, a bitmap may be utilized to represent a combination of non-consecutive HPNs. In this case, the size of the bitmap may be 16 bits. Alternatively, a bitmap having a size of less than 16 bits may be used to indicate a combination of HPNs. The combination of HPNs may be indicated by the first HPN and/or the number of consecutive HPNs. The first HPN may be indicated by four bits, and the number of consecutive HPNs may be indirectly indicated by the TDRA table. The number of SLIVs (e.g., the number of TBs) indicated by the TDRA table may be regarded as the number of consecutive HPNs. When the TDRA table indicates transmission resources of K TBs, the size of the TBTI included in the DCI may be (4+K) bits. (4+K) bits may be less than 16 bits.

Figure 12A:
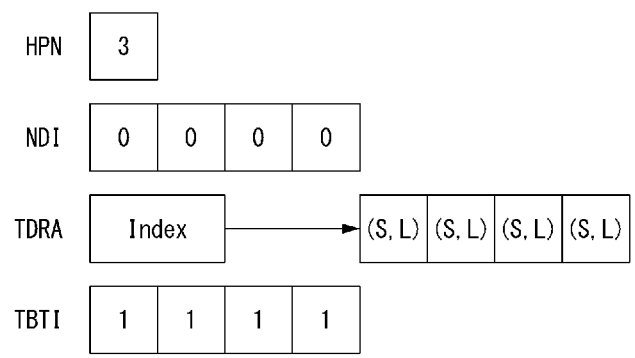
FIG. 12A is a conceptual diagram illustrating a first exemplary embodiment of control information for initial transmission.

FIG. 12A is a conceptual diagram illustrating a first exemplary embodiment of control information for initial transmission.

Referring to FIG. 12A, the base station may transmit DCI scheduling initial transmission of four TBs to the terminal. DCI may include HPN, NDI, TDRA index, and/or TBTI. The terminal may receive the DCI from the base station, and may derive four SLIVs (e.g., S and/or L) from the TDRA index included in the DCI. In this case, it may be assumed that the terminal receives four TBs. Since the DCI indicates a HPN #3, the four TBs received at the terminal may be processed in the HPN #3, HPN #4, HPN #5, and HPN #6. The DCI may include an NDI, and the NDI of each of the four TBs may be set to 0. According to Method 5.3-4, the DCI may include the TBTI. The size of the TBTI may be four bits, and the value of the TBTI may be '1111'. The TBTI set to '1111' may indicate reception of all four TBs.

The terminal may perform a reception operation of four TBs based on the DCI, and may generate HARQ-ACK bits for the four TBs. The size of the HARQ-ACK bits may be four bits. The terminal may transmit a HARQ codebook including the HARQ-ACK bits to the base station. Here, the HARA-ACK bits for the first TB, the second TB, and the fourth TB may indicate NACK, and the HARQ-ACK bit for the third TB may indicate ACK.

The base station may receive the HARQ codebook from the terminal, and may perform a retransmission operation (e.g., retransmission operation for three TBs) based on the HARQ codebook. The retransmission operation may be performed as follows.

Figure 12B:
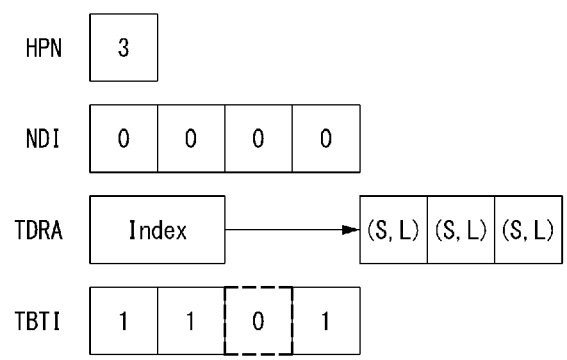
FIG. 12B is a conceptual diagram illustrating a first exemplary embodiment of control information for retransmission.

FIG. 12B is a conceptual diagram illustrating a first exemplary embodiment of control information for retransmission.

Referring to FIG. 12B, the base station may transmit DCI for scheduling retransmission of three TBs to the terminal. The DCI may include HPN, NDI, TDRA index, and/or TBTI. The terminal may receive the DCI from the base station, and may derive three SLIVs (e.g., S and/or L) from the TDRA index included in the DCI. In this case, it may be assumed that the terminal receives three TBs. Since the DCI indicates a HPN #3, three TBs received at the terminal may be processed in three HPNs among the HPNs #3 to #6. According to Method 5.3-4 or Method 5.3-5, when the TBTI included in the DCI is set to '1101', the terminal may determine that the HPNs of the three TBs are the HPN #3, HPN #4, and HPN #6. The terminal may interpret the value (e.g., '0000') of the NDI included in the DCI based on the TBTI value (i.e., '1101'). The terminal may determine a toggle for each TB based on the interpretation of the NDI value. Here, the third value of the NDI may be interpreted as 'don't care (DC)' by the TBTI. Alternatively, the third value of the NDI may be ignored.

On the other hand, a method of not increasing the size of the DCI may be considered. This method may be applied to a PDSCH transmission procedure. Since the terminal transmits a HARQ-ACK to the base station, the base station may not retransmit a TB before receiving a HARQ-ACK for the same HPN.

Method 5.3-6: When the terminal transmits ACK for a HPN, it may be assumed that the terminal does not receive scheduling information for retransmission of a TB associated with the HPN.

Even when the terminal transmits ACK, the base station may indicate retransmission by transmitting DCI including an NDI set to the same value (e.g., value that is not toggled). The terminal may receive the same TB and may generate a HARQ-ACK for the received TB. Even when a CRC operation for the TB is completed, the terminal may perform a soft combining procedure again. ACK may be regenerated with a high probability, and the terminal may transmit ACK to the base station. Since power consumption of the terminal is reduced when a retransmission procedure of the TB is not performed, the base station may consider Method 5.3-6.

In this case, even when the DCI does not include the TBTI, the terminal may use a HARQ-ACK previously derived for the same HPN as the TBTI. For example, if a decoding result of the TB is ACK, it may be assumed that the terminal does not receive the corresponding TB again. If the decoding result of the TB is NACK, the terminal may assume that the TB is to be received again.

Figure 13A:
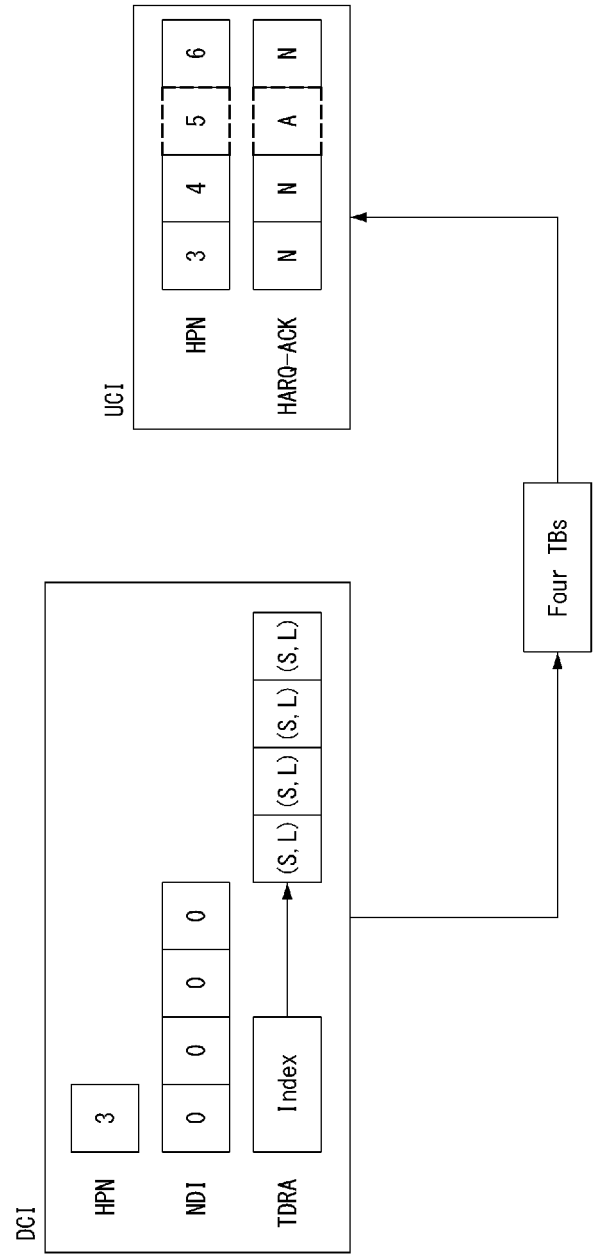
FIG. 13A is a conceptual diagram illustrating a second exemplary embodiment of control information for initial transmission.

FIG. 13A is a conceptual diagram illustrating a second exemplary embodiment of control information for initial transmission.

Referring to FIG. 13A, the base station may transmit DCI scheduling initial transmission of four TBs to the terminal. The DCI may include HPN, NDI, and/or TDRA index. The terminal may receive the DCI from the base station, and may derive four SLIVs (e.g., S and/or L) from the TDRA index included in the DCI. In this case, it may be assumed that the terminal receives four TBs. Since the DCI indicates a HPN #3, the four TBs received at the terminal may be processed in the HPN #3, HPN #4, HPN #5, and HPN #6. The DCI may include the NDI, and NDI of each of the four TBs may be set to 0.

The terminal may perform a reception operation of four TBs based on the DCI, generate HARQ-ACK bits for the four TBs, and transmit UCI including the HARQ-ACK bits to the base station. Here, the HARQ-ACK bits for the first TB (e.g. HPN #3), the second TB (e.g., HPN #4), and the fourth TB (e.g. HPN #6) may indicate NACK, and the HARQ-ACK bit for the third TB (e.g., HPN #5) may indicate ACK.

The base station may receive the HARQ codebook from the terminal, and may perform a retransmission operation (e.g. retransmission operation for three TBs) based on the HARQ codebook. The retransmission operation may be performed as follows.

Figure 13B:
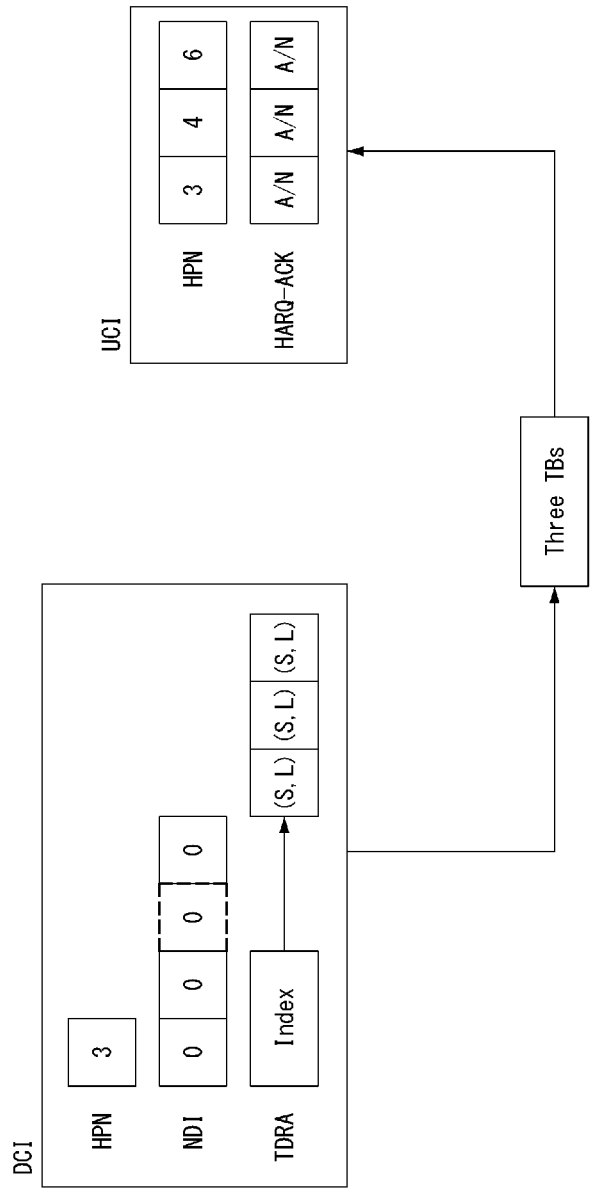
FIG. 13B is a conceptual diagram illustrating a second exemplary embodiment of control information for retransmission.

FIG. 13B is a conceptual diagram illustrating a second exemplary embodiment of control information for retransmission.

Referring to FIG. 13B, the base station may transmit DCI for scheduling retransmission of three TBs to the terminal. The DCI may include HPN, NDI, and/or TDRA index. The terminal may receive the DCI from the base station and may derive three SLIVs (e.g., S and/or L) from the TDRA index included in the DCI. In this case, it may be assumed that the terminal receives three TBs. Since the DCI indicates a HPN #3, three TBs received at the terminal may be processed in three HPNs among the HPNs #3 to #6. According to Method 5.3-6, the terminal may determine that retransmission for the HPN #5 is not indicated. Therefore, the terminal may determine that the value of NDI (i.e., '0000') is not toggled to mean retransmission for the HPNs #3, #4, and #6. Here, the third value of the NDI may be interpreted as 'don't care (DC)'. Alternatively, the third value of the NDI may be ignored.

5.4: Method of Interpreting DCI (e.g., Fields of DCI) for Bandwidth Part (BWP) Switching DCI may indicate BWP switching (e.g., BWP change). For example, the DCI may include information on switching from BWP1 to BWP2 and PDSCH allocation information or PUSCH allocation information. PDCCH configuration may vary depending on a BWP. Therefore, the size of the DCI field may vary according to the configuration of the base station. When the size of the DCI field increases, the terminal may interpret that the size of the DCI field is increased than that of the configured DCI field. When the size of the DCI field is decreased, the terminal may interpret that the size of the DCI field is decreased than that of the configured DCI field.

When it is interpreted that the size of the DCI field is increased, '0' may be added to the most significant bits (MSBs) of the corresponding DCI field. When it is interpreted that the size of the DCI field is decreased, only the least significant bits (LSBs) of the corresponding DCI field may be interpreted. For example, if the DCI field includes [b3, b2, b1, b0] and the size of the DCI field is interpreted as increased, the terminal may interpret the DCI field as [0, 0, b3, b2, b 1, b0]. If the DCI field includes [b3, b2, b1, b0] and the size of the DCI field is interpreted as reduced, the terminal may interpret the DCI field as [b1, b0].

The above-described DCI field interpretation method may be applied to scheduling DCI. In this case, since the degree of freedom for resource allocation is reduced, efficiency may be reduced. However, the interpretation of the DCI field at the base station and the terminal may be clear, and the above-described inefficiency may occur only in DCI indicating BWP switching. Accordingly, the burden on the communication system may not be large. However, since the terminal may perform unnecessary operations, power consumption of the terminal may increase.

As one method, K1 or less TBs may be scheduled in BWP1, and K2 or less TBs may be scheduled in BWP2. In this case, the sizes of the RV field and the NDI field may be changed. Each of K1 and K2 may be a natural number.

Method 5.4-1: When the maximum number of schedulable TBs increases by BWP switching (e.g., BWP1→BWP2) (e.g., K1<K2), the terminal may assume that K1 TBs are scheduled by DCI indicating the BWP switching.

In this case, the base station may not be able to schedule (K2−K1) TBs to the terminal. That is, inefficiency may occur. However, since DCI indicating BWP switching does not occur frequently, the inefficiency may not be large.

'0' may be added to the RV field. However, the RV field to which '0' is not added may be interpreted in BWP2. That is, the terminal may interpret the value of the RV field of BWP1 as the RV of the TB scheduled in BWP2.

Method 5.4-2: In Method 5.4-1, the terminal may interpret only the LSBs of the NDI field to which '0' is not added. (K2−K1) zeros may be utilized, and K1 bits may be utilized.

This method may mean that at least the NDI field is interpreted differently from other DCI fields (e.g., DCI field to which '0' is added) when the BWP is switched.

According to another method, the interpretation method of the DCI field may be improved so that the DCI can schedule K2 TBs.

When '0' is added to the RV field, the terminal may interpret the RV as 0. Even in the retransmission procedure of the corresponding TB, the terminal may consider the RV to be 0.

If '0' is added to the NDI field, the terminal may not be able to determine whether the TB associated with the corresponding NDI field is an initial transmission TB or a retransmission TB. Therefore, the NDI field may be interpreted as in Method 5.4-3 below.

Method 5.4-3: The NDI field may be interpreted in a reverse order. The terminal may interpret from the LSB of the NDI field.

For example, if the DCI field received at the terminal is [b3, b2, b1, b0] and the size of the DCI field increases, the terminal may interpret [0, 0, b3, b2, b1, b0] as [b0, b1, b2, b3, 0, 0]. In this case, information having a meaning in the NDI field may be mapped to the corresponding TB.

According to Method 5.4-3, only the NDI field included in the DCI indicating BWP switching may be interpreted differently. When the interpretation of the NDI field starts from the MSB to which '0' is appended, the terminal may not be able to determine whether to maintain a circular buffer or HARQ combining buffer for the HPN appended with 0. In this case, the terminal may determine whether the TB is a initial transmission TB or a retransmission TB based on information other than the NDI.

Method 5.4-4 and/or Method 5.4-5 below may be used in a PDSCH reception procedure.

The terminal may receive downlink feedback information (DFI) from the base station in order to transmit a PUSCH. The DFI may include HARQ-ACKs for all HPNs configured in the terminal. Accordingly, Methods 5.4-4 and/or Method 5.4-5 below may be used as they are.

Method 5.4-4: The size of the NDI field may increase due to BWP switching. In this case, the terminal may determine that a HPN related to the NDI field having an increased size is related to the last HARQ-ACK transmitted to the base station (or the last HARQ-ACK received from the base station), and the terminal may interpret initial transmission or retransmission based on the determination result.

Method 5.4-5: In Method 5.4-4, the terminal may transmit a HARQ-ACK related to the HPN. Alternatively, the terminal may not receive the HARQ-ACK related to the HPN. In this case, when the NDI included in the DCI is set to 0, the terminal may consider that the NDI is toggled. Alternatively, the terminal may determine that the corresponding DCI schedules initial transmission.

If the terminal is not instructed (or configured) to receive DFI by RRC signaling of the base station, the terminal may not receive DFI from the base station. Alternatively, the terminal may receive DFI after a certain time (e.g., cg-minDFIDelay or a time required for a decoding operation) from a transmission time of a PUSCH. In this case, the terminal may determine that the HARQ-ACK for the HPN is invalid, and may ignore the HARQ-ACK.

When the terminal does not receive DFI, it may be assumed that initial transmission or retransmission is performed based on a technical specification.

Method 5.4-6: The terminal may perform BWP switching according to indication of DCI, and may transmit a PUSCH in the changed BWP. In this case, when the size of the NDI field is increased, the terminal may assume that a HPN corresponding to NDI appended with 0 is related to initial transmission or retransmission.

For example, the terminal may identify whether there is a value stored in the terminal as the NDI is indicated by the DCI for the corresponding HPN.

The terminal may determine whether there is an NDI stored in the terminal. If there is an NDI stored in the terminal, the terminal may consider that the HPN corresponding to the NDI set to 0 is related to retransmission. If the NDI stored in the terminal does not exist, since a TB transmission for the corresponding HPN is not scheduled, the terminal may regard the corresponding HPN as related to initial transmission.

For example, the terminal may assume that the NDI is 0 in the BWP in which the serving cell is activated (e.g., firstActiveDownlinkBWP). In this case, the DCI may include an NDI for a specific HPN, and the corresponding NDI may be set to 0. The terminal may consider at least PUSCH transmission as only initial transmission. On the other hand, the terminal may regard the PDSCH transmission as initial transmission or retransmission. For example, the terminal may regard the PDSCH transmission as initial transmission or retransmission based on a criterion defined in a technical specification.

The terminal may consider the first TB received in the transmission procedure of the PDSCH according to the HPN as a retransmission TB. Even when the decoding result of the TB is NACK, it may be considered that there is no problem in the communication system. When no signal (e.g., TB) is received in the transmission procedure of the PUSCH according to the HPN, the operation of the terminal may not be defined for a case where retransmission is requested.

Chapter 6: PUSCH Transmission Method 6.1: Methods of Restricting a Combination of UCI Types Multiplexed in a PUCCH Differently from a Combination of UCI Types Multiplexed in a PUSCH UCI may be generated for each UCI type. In addition, UCI may be generated for each UCI priority. Accordingly, the terminal may perform various encoding procedures, and thus power consumption of the terminal may increase. In order to receive both HP UCI and LP UCI in a PUSCH without errors, the base station may allocate a large amount of radio resources to the terminal.

When LP UCI and HP UCI are multiplexed in a PUCCH, the HP UCI may be restricted to include HARQ-ACK, and the LP UCI may be restricted to include HARQ-ACK. Alternatively, the HP UCI may be restricted to include HARQ-ACK, and the LP UCI may be restricted to include CSI. When a CSI report is not transmitted periodically (e.g., semi-persistent CSI report, aperiodic CSI report), other combinations of control information may be considered. The aperiodic CSI report may be transmitted by triggering.

The semi-persistent CSI report may be transmitted on a PUCCH or PUSCH.

Method 6.1-1: When the size of UCI transmitted on a PUCCH is 3 bits or more and the HP UCI includes HARQ-ACK, LP UCI may be restricted to have a UCI type including at least one of HARQ-ACK or CSI.

The terminal may consider UCI including (HP HARQ-ACK, LP HARQ-ACK), (HP HARQ-ACK, semi-persistent CSI), or (HP HARQ-ACK, periodic CSI). When Method 6.1-1 is applied, the terminal may multiplex CSI and LP HARQ-ACK. In this case, the terminal may assume that HP HARQ-ACK is not additionally multiplexed.

HP DCI indicating transmission of HP UCI may include scheduling information of a PUSCH. In this case, the terminal may consider more combinations than the combinations according to Method 6.1-1. For example, the terminal may further consider a combination including aperiodic CSI. The terminal may consider HP UCI including HP HARQ-ACK, HP aperiodic CSI, and/or HP LRR, and may consider multiplexing of the corresponding HP UCI and LP UCI.

Method 6.1-2: When the size of UCI transmitted on a PUSCH is 3 bits or more and HP UCI includes HARQ-ACK, LP UCI may be multiplexed with the HP UCI without restriction in UCI type.

According to Method 6.1-2, the terminal may generate a combination of HP UCI and LP UCI without restrictions. Accordingly, the terminal may generate various codewords. The terminal may consider HP UCI including HARQ-ACK, aperiodic CSI, and/or LRR, and may consider LP UCI including (HARQ-ACK, aperiodic CSI), (semi-persistent CSI), or (periodic CSI, LRR). The terminal may consider LP UCI and HP UCI including only one type of CSI. For example, the terminal may consider only one type of CSI among aperiodic CSI, semi-persistent CSI, and periodic CSI. In this case, the CSI may be expressed as one CSI in consideration of all priorities. Regardless of the priorities, one CSI (e.g., one type of CSI) may be included in a PUSCH. The one CSI may follow a CSI reporting setting indicated by a technical specification and/or RRC signaling.

UCI may be generated for each UCI type. In addition, UCI may be generated for each UCI priority. Accordingly, the terminal may perform various encoding procedures, and thus power consumption of the terminal may increase. In order to receive both HP UCI and LP UCI in a PUSCH without errors, the base station may allocate a large amount of radio resources to the terminal. In order to reduce the number of times of performing an encoding procedure performed in the terminal and to reduce radio resources used in the terminal, the UCI type of the LP UCI may be restricted.

Method 6.1-3: When UCI transmitted on a PUSCH includes HP UCI including HARQ-ACK, LP UCI may be restricted to have a UCI type including at least one of HARQ-ACK or periodic CSI.

The difference between Method 6.1-2 and Method 6.1-3 may be in that the terminal generates the HP UCI without restriction on UCI type, but selects some UCI types to generate the LP UCI. That is, since the base station has sufficient control, it can properly schedule the terminal. However, some UCI types for the LP UCI may be restricted by the technical specifications, and both HARQ-ACK and CSI may not be multiplexed.

For example, the terminal may consider HP UCI including (HARQ-ACK, semi-persistent CSI) or (HARQ-ACK, periodic CSI), may consider LP UCI including HARQ-ACK, may multiplex the HP UCI and the LP, and may transmit the multiplexed UCIs (e.g., HP UCI+LP UCI) on a PUCCH.

For another example, the terminal may consider HP UCI including (HARQ-ACK, aperiodic CSI) or (HARQ-ACK, semi-persistent CSI), and may consider LP UCI including HARQ-ACK, may multiplex the HP UCI and the LP UCI, and transmit the multiplexed UCIs (e.g., HP UCI+LP UCI) on a PUSCH. HP DCI triggering aperiodic CSI may include resource allocation information of the PUSCH. HP DCI for semi-persistent CSI may include resource allocation information of the activated PUSCH.

For another example, the terminal may consider HP UCI including HARQ-ACK and semi-persistent CSI, may consider LP UCI including HARQ-ACK, may multiplex the HP UCI and the LP UCI, and may transmit the multiplexed UCIs (e.g., HP UCI+LP UCI) on a PUSCH. HP DCI indicating transmission of semi-persistent CSI and/or HARQ-ACK may include resource allocation information of the PUSCH. When a HARQ-ACK of an SPS PDSCH is involved, transmission of the semi-persistent CSI may not be scheduled by DCI. When an activated PUSCH resource is used by the terminal or when LP DCI indicates transmission of HARQ-ACK, a PUSCH resource may be scheduled, and both the HP UCI and the LP UCI may be multiplexed.

6.2: Methods for Indication by Using a Beta Offset

A separate field included in DCI may indicate multiplexing of LP UCI and HP UCI. Alternatively, multiplexing of LP UCI and HP UCI, multiplexing of HP UCIs, or multiplexing of LP UCIs may be indicated by implicitly using a field(s) included in DCI. Method 2.2-1 described above may be extended. In this case, a separate field may be introduced into DCI. Alternatively, other field(s) included in DCI may be used implicitly.

In an exemplary embodiment, DCI may always be HP DCI. Alternatively, DCI may not necessarily be limited to HP UCI. When DCI is limited to HP DCI (e.g., when Method 2.2-2 is applied), information indicating multiplexing of LP UCI may be derived from a beta offset indicator field. The beta offset indicator field may be referred to as a beta offset field or a beta offset indicator.

When UCIs having the same priority are considered, the beta offset field may be expressed as an index of values of (HARQ-ACK offset, CSI part 1 offset, CSI part 2 offset). When UCIs having different priorities are considered, various combinations may be considered.

According to a technical specification, the beta offset field may be expressed as an index indicating one of four cases. The terminal may derive three values from one index of the beta offset field, and each of the three values may correspond to a beta offset of the HARQ-ACK, a beta offset of the CSI part 1, and a beta offset of the CSI part 2. The beta offset of the HARQ-ACK may be expressed as different beta offsets according to three encoding schemes. The base station may set (or indicate) the above-described index(es) and/or beta offset(s) to the terminal by using RRC signaling.

A combination in which HP UCI and LP UCI are multiplexed may be limited to only HARQ-ACK. In this case, if HP DCI includes a beta offset indicator, the terminal may interpret one value according to the beta offset indicator as HP HARQ-ACK, and interpret another value according to the beta offset indicator as LP HARQ-ACK. If LP DCI includes a beta offset indicator, the terminal may interpret one value according to the beta offset indicator as HP HARQ-ACK, and may interpret another value according to the beta offset indicator as LP HARQ-ACK. Here, the terminal may not interpret the value according to the beta offset indicator as CSI. When DCI indicates transmission (or presence) of HP UCI, the interpretation of the beta offset indicator by the terminal may be different.

Therefore, the base station may dynamically inform the terminal of a multiplexing method when the priority of PUSCH and the priority of UCI are the same and a multiplexing method when the priority of PUSCH and the priority of UCI are different. In a proposed method, depending on the presence or absence of UCIs (or HARQ-ACKs) having different priorities, the method of interpreting the beta offset indicator by the terminal may be different.

Method 6.2-1: The base station may configure (or indicate) two sets of beta offsets to the terminal by using RRC signaling, and the terminal may identify the two sets of beta offsets configured by the base station. The first set of beta offsets may be used for transmission of UCIs having the same priority, and the second set of beta offsets may be used for transmission of UCIs having different priorities.

Method 6.2-2: When UL DCI includes a beta offset indicator in Method 6.2-1 and HARQ-ACKs having different priorities are present, the terminal may interpret the beta offset indicator as beta offsets for HP HARQ-ACK and LP HARQ-ACK. When HARQ-ACKs having different priorities are absent, the terminal may interpret the beta offset indicator as beta offsets for HARQ-ACK and CSI.

Here, even though both the HP HARQ-ACK and the LP HARQ-ACK are present, the base station may indicate to the terminal that transmission of the LP HARQ-ACK is dropped. If the beta offset indicator includes 0, the terminal may not transmit the LP HARQ-ACK.

The beta offset indicator including '0' may be limited to be applied only to LP UCI. If the LP UCI does not include HARQ-ACK, the terminal may interpret that transmission of CSI of the LP UCI is also dropped.

Method 6.2-3: In Method 6.2-1 and/or Method 6.2-2, the beta offset indicator for only LP HARQ-ACK may be indicated as 0. When the beta offset of the LP HARQ-ACK is indicated as 0, CSI, SR, and/or LRR classified as LP UCI may be dropped regardless of the value of the beta offset.

Meanwhile, the terminal may receive a plurality of DCIs. Here, in DCIs received in the same slot, information indicating whether HP UCI and LP UCI are multiplexed and/or information indicating whether LP UCI is dropped may be equally indicated. The above-described information may be explicitly indicated by a separate field included in the DCI. Alternatively, the above-described information may be implicitly derived by an existing field included in DCI. Alternatively, the terminal may use both the above-described explicit indication method and the above-described implicit derivation method.

Method 6.2-4: In DCIs (e.g., DCI format) received in the same slot, information indicating whether HP UCI and LP UCI are multiplexed and/or information indicating whether LP UCI is dropped may be indicated equally.

However, in DCIs received in different slots, the information indicating whether HP UCI and LP UCI are multiplexed and/or the information indicating whether LP UCI is dropped may be indicated differently. The reason is that it is difficult to keep an error rate of the HP UCI sufficiently low as the size of the LP UCI is changed.

6.3: Methods of Mapping Encoded Data

The terminal may multiplex HP UCI and a part of LP UCI, and may transmit the multiplexed UCIs (e.g., HP UCI+par of LP UCI) on a PUCCH. The terminal may determine a PUCCH resource set according to the size of the multiplexed UCIs. In this case, a PUCCH resource index may be indicated by scheduling DCI. The scheduling DCI may be HP DCI indicating to the terminal transmission of the HP UCI. When the size of UCI is 3 bits or more, the terminal may perform an independent encoding procedure for each of the HP UCI and the LP UCI.

When a PUSCH and a PUSCH are located in the same symbol(s) or when a PUSCH is transmitted in a subslot in which a PUCCH is transmitted, the terminal may multiplex UCI (e.g., HP UCI and/or LP UCI) to be transmitted on the PUCCH in the PUSCH. In this case, a TB (or data) included in the PUSCH may be mapped by rate matching or puncturing according to the size of the UCI.

According to a technical specification, the TB may be coded, and the UCI (e.g., HP UCI or LP UCI) may be multiplexed with the coded TB. If the size of the UCI is 1 bit or 2 bits, the terminal may map the TB (e.g., coded TB) to RE(s) of the PUSCH, and may map the UCI to some RE(s) of the PUSCH by perform spreading on the UCI. That is, the TB may be punctured. If the size of the UCI is 3 bits or more, the RE(s) to which the TB is mapped may be distinguished from the RE(s) to which the UCI is mapped. In this case, the terminal may perform rate matching on the TB (e.g., encoded TB) and may perform rate matching on the UCI. The Rate matching when the UCI is encoded according to the Reed Muller code may be different from the rate matching when UCI the is encoded according to the polar code.

The LP UCI and HP UCI may be multiplexed, the LP UCI may have as size of nLP bits, and the HP UCI may have a size of nHP bits. In this case, the rate matching for the TB may be performed as follows. For example, the terminal may consider both the nLP and nHP equally as UCI, and thus may perform the rate matching for the TB.

Method 6.3-1: When nLP+nHP is 3 or more, the rate matching for the TB may be performed on the remaining REs excluding the REs occupied by the LP UCI and the HP UCI among all REs of the PUSCH.

The transmission of the PUSCH may be scheduled by HP DCI and/or LP DCI, the HP UCI may not be distinguished from the LP UCI, and accordingly, the rate matching for the TB may be performed. However, when the HP UCI has a size of 1 bit (e.g., nHP=1) or when the LP UCI has a size of 2 bits (e.g., nLP=2), according to Method 6.3-1, the terminal may perform an encoding procedure, and the rate matching may be performed for the TB based on the result of the encoding procedure. According to a technical specification, when the UCI has a size of 1 bit or 2 bits, the TB may be punctured. That is, the UCI may be re-mapped to the RE(s) to which the TB is mapped.

In another proposed method, when the HP UCI has a size of 1 bit (e.g., nHP=1) or when the LP UCI has a size of 2 bits (e.g., nLP=2), the terminal may perform puncturing for the TB. When the HP UCI or the LP UCI has a size of 3 bits or more, the terminal may perform rate matching for the TB. When the HP UCI has a size of 1 bit (e.g., nHP=1) or when the LP UCI has a size of 2 bits (e.g., nLP=2), the puncturing for the TB may be assumed to be performed.

Method 6.3-2: When nLP+nHP is 3 (e.g., when the LP UCI has a size of 1 bit and the HP UCI has a size of 2 bits), the terminal may perform puncturing for the TB. When (nLP+nHP) exceeds 3, the terminal may perform rate matching for the TB in the remaining REs excluding the REs used by the corresponding UCI among all REs of the PUSCH.

6.4: Methods for Transmitting Configured Grant (CG)-UCI

When a CG PUSCH is configured and/or activated, the terminal may multiplex CG-UCI and a TB, and may transmit the multiplexed CG-UCI and TB on the CG PUSCH. The CG-UCI may include HPN, RV, NDI, and/or COT related information.

When the terminal performs omni-directional or directional sensing to transmit the CG PUSCH, the COT-related information may include 'information indicating that a corresponding COT is regarded as a COT initiated by the terminal, and the base station cannot use the COT' or 'the length and a channel access priority class (CAPC) index of the corresponding COT when the base station uses the COT'. When the CG PUSCH is transmitted in an unlicensed band, the base station may instruct (or configure) the terminal to transmit the CG-UCI including the COT-related information by using RRC signaling.

The terminal may multiplex the LP UCI, HP UCI, and/or TB in the CG PUSCH. The base station may transmit information on a priority of the CG PUSCH to the terminal by using RRC signaling, and the terminal may identify the priority of the CG PUSCH indicated by the base station. According to a technical specification, the terminal may multiplex a PUCCH and a PUSCH having the same priority. The priority of the PUCCH may follow the priority of UCI, and the priority of the CG PUSCH may be indicated by RRC signaling. The terminal may encode both the CG-UCI and a HARQ-ACK, and equally calculate the CG-UCI and HARQ-ACK to derive the size of UCI. When the priority of the PUCCH is different from that of the CG PUSCH, the terminal may transmit the PUCCH or CG PUSCH having a higher priority, and may drop transmission of the PUCCH or CG PUSCH having a lower priority.

In order to compensate for the above-described problem, the terminal may transmit both the LP UCI and the HP UCI on the CG PUSCH. Whether to allow this operation may be indicated (or configured) to the terminal by RRC signaling of the base station. When the transmission operation of the LP UCI and the HP UCI on the CG PUSCH is not allowed or indicated to the terminal, the terminal may multiplex the CG PUSCH and UCI having the same priority according to a technical specification.

Method 6.4-1: The base station may indicate (or configure) whether to allow the multiplexing operation of UCI and CG PUSCH having different priorities to the terminal by using RRC signaling.

The terminal may distinguish between a CG PUSCH and a HARQ-ACK having the same priority, and may generate a codeword by performing the same encoding procedure for the HARQ-ACK having the same priority as the CG PUSCH and the CG-UCI. The terminal may generate a codeword by performing an encoding procedure for the HARQ-ACK having a priority different from that of CG PUSCH, and may generate a codeword by performing an encoding procedure for the CG-UCI. That is, the encoding procedure of each of the HARQ-ACK and the CG-UCI may be independently performed, and different codewords may be generated.

When the size of the HARQ-ACK having a different priority than the CG PUSCH is large, it may be preferable to drop the transmission of the corresponding HARQ-ACK on the CG PUSCH. In this case, the terminal may inform the base station whether transmission of the HARQ-ACK is dropped.

DCI including resource allocation information of HP HARQ-ACK and LP HARQ-ACK may indicate to the terminal whether to perform a multiplexing operation for the UCI. For example, the HP DCI may include information indicating execution of a multiplexing operation for the UCI or information indicating dropping of transmission of the UCI. The terminal may generate a PUCCH and identify whether a time resource of the PUCCH overlaps a time resource of the CG PUSCH. When the PUCCH overlaps the CG PUSCH in the time domain, the terminal may multiplex UCI to be transmitted on the PUCCH in the CG PUSCH.

However, the size of the CG PUSCH resource may not always be sufficient. Since the number of REs that can be allocated to the TB is reduced when the size of the HARQ-ACK(s) is large, the effective code rate of the TB may be increased. When an error occurs in a decoding procedure of the PUSCH, the base station may transmit DCI for retransmission thereof to the terminal, and the terminal may receive the DCI for the retransmission from the base station. Alternatively, in a communication system operating in an unlicensed band, the terminal may know ACK or NACK for the PDSCH by receiving CG-DFI from the base station. In this case, the terminal may retransmit the same TB.

In order to support the above-described operation, the CG-UCI (e.g., field of the CG-UCI) may include NDI and RV. That is, the terminal may inform the base station whether to perform the retransmission operation of the TB by transmitting the CG-UCI. In this case, the terminal may additionally transmit information indicating whether to perform the multiplexing operation for the LP UCI and the HP UCI to the base station.

Method 6.4-2: A new field may be introduced into the CG-UCI, and the new field having a first value may indicate that UCIs having different priorities are multiplexed. The new field having a second value may indicate that UCIs having the same priority are multiplexed and transmission of UCI having a different priority is dropped.

6.5: Methods for Receiving CG-Downlink Feedback Information (CG-DFI)

The base station may transmit DFI to the terminal. When a CG PUSCH is configured and/or activated in the terminal, the DCI format 0_1 may include a specific field. The specific field included in the DCI format 0_1 may be referred to as a DFI flag, and the size of the DFI flag may be 1 bit.

When the DCI format 0_1 (e.g., CRC of the DCI format 0_1) is scrambled by a configured scheduling-radio network temporary identifier (CS-RNTI) and the DFI flag included in the DCI format 0_1 has a first value, the terminal may consider that a type 2 CG PUSCH is activated by the DCI format 0_1 (e.g., DFI flag). When the DCI format 0_1 is scrambled by a CS-RNTI and the DFI flag included in the DCI format 0_1 has a second value, the terminal may consider the DFI flag included in the DCI format 0_1 as CG-DFI. When the DCI format 0_1 received by the terminal is scrambled by a C-RNTI, MCS-C-RNTI, or SP-CSI-RNTI, the terminal may consider that the DFI flag is reserved.

The CG-DFI according to the DCI format 0_1 may include a HARQ-ACK bitmap and a TPC command for the PUSCH, and the remaining bits constituting the DCI format 0_1 may be set to 0. The length of the DCI format 0_1 may be determined by a technical specification, a configuration of the base station, a relationship with a search space set, and/or a processing capability of the terminal.

Method 6.5-1: A DCI format 0_2 may include CG-DFI, and when a DFI flag has a first value, DCI may be interpreted as the CG-DFI, When the DCI format 0_2 is scrambled by a CS-RNTI and the DFI flag included in the DCI format 0_2 has a first value, the terminal may consider that a type 2 CG PUSCH is activated by the DCI format 0_2 (e.g., DFI flag). When the DCI format 0_2 is scrambled by a CS-RNTI and the DFI flag included in the DCI format 0_2 has a second value, the terminal may consider the DFI flag included in the DCI format 0_2 as CG-DFI. When the DCI format 0_2 received by the terminal is scrambled by a C-RNTI, MCS-C-RNTI, or SP-CSI-RNTI, the terminal may consider that the DFI flag is reserved.

The CG-DFI according to the DCI format 0_2 may include a HARQ-ACK bitmap and a TPC command for the PUSCH, and the remaining bits constituting the DCI format 0_2 may be set to 0. The length of the DCI format 0_2 may be determined by a technical specification, a configuration of the base station, a relationship with a search space set, and/or a processing capability of the terminal.

The size of the HARQ-ACK bitmap may be 16. The reason is that a HPN transmittable by the CG PUSCH is derived from an index of a starting slot in which the CG PUSCH is transmitted and/or an offset set by RRC signaling. This is because if the size of the HARQ-ACK bitmap is not the same in the DCI format 0_1 and the DCI format 0_2, the DCI format 0_2 cannot include a part of HARQ-ACK bits.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
    selecting one or more control elements among a plurality of control elements included first uplink control information (UCI) in consideration of a size of an uplink resource;
    generating multiplexed UCIs by multiplexing second UCI with the one or more control elements; and
    transmitting the multiplexed UCIs to a base station by using the uplink resource,
    wherein the uplink resource is a physical uplink control channel (PUCCH) resource, a first codeword for the one or more control elements is generated based on a first code rate, and a second codeword for the second UCI is generated based on a second code rate,
    when the first code rate for the PUCCH resource for the first UCI is not indicated, the first code rate is associated with a format of the PUCCH resource for the first UCI.

2. The operation method according to claim 1, wherein when a total size of the first UCI is a first size, and the first UCI having a second size smaller than the first size is multiplexable with the second UCI, the one or more control elements are selected among the plurality of control elements and transmission of remaining control elements is dropped.

3. The operation method according to claim 1, wherein when the plurality of control elements include channel state information (CSI) and hybrid automatic repeat request-acknowledgement (HARQ-ACK), the one or more control elements are the HARQ-ACK, a part of the CSI and the HARQ-ACK, a CSI part 1 of the CSI and the HARQ-ACK, or a CSI part 2 of the CSI and the HARQ-ACK.

4. The operation method according to claim 1, further comprising receiving, from the base station, information indicating multiplexing of the first UCI and the second UCI, wherein the multiplexed UCIs are generated in response to receiving the information.

5. The operation method according to claim 1, wherein the first UCI is low priority (LP) UCI having a low priority, and the second UCI is high priority (HP) UCI having a high priority.

6. The operation method according to claim 1, wherein a PUCCH resource set to which the PUCCH resource belongs is determined in consideration of a size of the one or more control elements and a size of the second UCI.

7. The operation method according to claim 1, further comprising:
    receiving first downlink control information (DCI) from the base station; and
    receiving second DCI from the base station,
    wherein transmission of the first UCI is indicated by the first DCI, and transmission of the second UCI is indicated by the second DCI.

8. The operation method according to claim 1, wherein the first code rate is associated with a first PUCCH format for the first UCI.

9. The operation method according to claim 1, wherein a first PUCCH format for the first UCI is derived from first DCI received from the base station, and the second PUCCH format for the second UCI is derived from second DCI received from the base station.

10. The operation method according to claim 1, wherein when the first code rate for the PUCCH resource for the first UCI is indicated, the first code rate is associated with the PUCCH resource for the first UCI.

11. The operation method according to claim 1, wherein the PUCCH resource is configured for transmission of the second UCI.

12. A terminal comprising:
    a processor;
    a memory electronically communicating with the processor; and
    instructions stored in the memory,
    wherein when executed by the processor, the instructions cause the terminal to:
    select one or more control elements among a plurality of control elements included first uplink control information (UCI) in consideration of a size of an uplink resource;
    generate multiplexed UCIs by multiplexing second UCI with the one or more control elements; and
    transmit the multiplexed UCIs to a base station by using the uplink resource,
    wherein the uplink resource is a physical uplink control channel (PUCCH) resource, a first codeword for the one or more control elements is generated based on a first code rate, and a second codeword for the second UCI is generated based on a second code rate, when the first code rate for the PUCCH resource for the first UCI is not indicated, the first code rate is associated with a format of the PUCCH resource for the first UCI.

13. The terminal according to claim 12, wherein a total size of the first UCI is a first size, and the first UCI having a second size smaller than the first size is multiplexable with the second UCI, the one or more control elements are selected among the plurality of control elements and transmission of remaining control elements is dropped.

14. The terminal according to claim 12, wherein when the plurality of control elements include channel state information (CSI) and hybrid automatic repeat request-acknowledgement (HARQ-ACK), the one or more control elements are the HARQ-ACK, a part of the CSI and the HARQ-ACK, a CSI part 1 of the CSI and the HARQ-ACK, or a CSI part 2 of the CSI and the HARQ-ACK.

15. The terminal according to claim 12, wherein the first code rate is associated with a first PUCCH format for the first UCI, and the first PUCCH format is configured identically to or differently from the second PUCCH format.

* * * * *